US012810330B2

(12) United States Patent
Carlson et al.

(10) Patent No.: US 12,810,330 B2
(45) Date of Patent: Nov. 24, 2026

(54) GENERATING A UNIFIED USER EXPERIENCE SCORE USING SENTIMENT ANALYSIS AND THEME CLASSIFICATION

(71) Applicant: Oracle International Corporation, Redwood Shores, CA (US)

(72) Inventors: Erin Kate Carlson, Seattle, WA (US); Kai (Jason) Yin, Sammamish, WA (US); Chunming Liu, Bellevue, WA (US); Mandy Lee Oh, Federal Way, WA (US); Mariangela Zanchetta, Seattle, WA (US); Kexin (Cathy) Cui, Bellevue, WA (US); Pratik Appaso Vagyani, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/485,228

(22) Filed: Oct. 11, 2023

(65) Prior Publication Data

US 2025/0124475 A1 Apr. 17, 2025

(51) Int. Cl.

*G06Q 30/0282* (2023.01)
*G06F 40/20* (2020.01)
*G06Q 10/40* (2026.01)

(52) U.S. Cl.

CPC ......... *G06Q 30/0282* (2013.01); *G06F 40/20* (2020.01); *G06Q 10/40* (2026.01)

(58) Field of Classification Search

CPC ........... G06Q 30/0282; G06Q 30/0201; G06Q 50/01; G06F 40/20
USPC .................................. 705/1.1–912, 319, 345
See application file for complete search history.

(56) References Cited

U.S. PATENT DOCUMENTS

| | | | | |
|---|---|---|---|---|
| 9,208,444 | B1 | 12/2015 | Zheng et al. | |
| 10,546,235 | B2 | 1/2020 | Moudy et al. | |
| 10,891,374 | B1 | 1/2021 | Curtin et al. | |
| 11,836,591 | B1 * | 12/2023 | Garvey | G06N 3/045 |
| 12,079,585 | B1 * | 9/2024 | Garvey | G06F 40/40 |
| 12,147,763 | B2 | 11/2024 | Stewart et al. | |

(Continued)

OTHER PUBLICATIONS

Serrano, Thea, "How To Measure User Experience and Why It's Important To Track UX," (https://thriveagency.com/news/how-to-measure-user-experience-and-why-its-important-to-track-ux/), Feb. 10, 2022. (Year: 2022).*

(Continued)

*Primary Examiner* — Jonathan P Ouellette
(74) *Attorney, Agent, or Firm* — Kilpatrick Townsend & Stockton LLP

(57) ABSTRACT

Techniques for generating a unified user experience (UX) score using sentiment analysis and theme classification, training multiple layers of a machine learning environment to perform sentiment analysis and theme classification, and arranging layers of a machine learning environment based on noise from training data are provided. A unified UX score is generated from categories that are indicative of a user's journey in association with the cloud service provider. Machine learning environments are trained and used to perform sentiment analysis and theme classification on user feedback data. The layers of a machine learning environment can also be arranged based on noise generated from training data used to train the models of the machine learning environments.

20 Claims, 17 Drawing Sheets

(56) References Cited

U.S. PATENT DOCUMENTS

| | | | | |
|---|---|---|---|---|
| 12,579,969 | B1 | 3/2026 | Liu et al. | |
| 2019/0156350 | A1 | 5/2019 | Jaroch | |
| 2019/0195525 | A1 | 6/2019 | Varghese et al. | |
| 2019/0356956 | A1 | 11/2019 | Sheng et al. | |
| 2021/0182583 | A1 | 6/2021 | Kim et al. | |
| 2021/0192540 | A1 | 6/2021 | Madduri et al. | |
| 2021/0312593 | A1 | 10/2021 | Okuno | |
| 2022/0358529 | A1 | 11/2022 | Rawat et al. | |
| 2024/0144107 | A1* | 5/2024 | Garvey | G06N 3/0455 |
| 2024/0320591 | A1* | 9/2024 | Garvey | G06F 30/27 |
| 2024/0354789 | A1* | 10/2024 | Garvey | G06N 20/00 |
| 2025/0124475 | A1 | 4/2025 | Carlson et al. | |

OTHER PUBLICATIONS

Hussain J, Khan WA, Hur T, Bilal HSM, Bang J, Hassan AU, Afzal M, Lee S. A Multimodal Deep Log-Based User Experience (UX) Platform for UX Evaluation. Sensors (Basel). May 18, 2018 (Year: 2018).*

Yinfeng Du, Dun Liu, Juan Antonio Morente-Molinera, Enrique Herrera-Viedma, A data-driven method for user satisfaction evaluation of smart and connected products, Expert Systems with Applications, vol. 210, 2022 (Year: 2022).*

"AI-Driven Social Media Dashboard Implementations AWS Solutions", Available Online at: https://aws.amazon.com/solutions/implementations/ai-driven-social-media-dashboard/, Accessed from internet on Apr. 6, 2023, 6 pages.

"Amazon Comprehend", Available Online at: https://aws.amazon.com/comprehend/, 2023, 5 pages.

"Analyze Sentiment in Customer Feedback (Preview)", Dynamics 365 Customer Insights, Microsoft Learn. Available Online at: https://learn.microsoft.com/en-us/dynamics365/customer-insights/sentiment-analysis., Feb. 6, 2023, pp. 1-8.

"Expert Analytics Online Help", SAP Predictive Analytics, pp. 1-208, Aug. 28, 2020.

"The Easiest Way to Know What Your Users Need is to Ask Them-Hotjar", Available Online at: https://www.hotjar.com/website-feedback-tools/, Accessed from internet on Apr. 6, 2023, pp. 1-11.

"Understanding the Comments Report: Theme, Sentiment and Text Analytics", Available Online at: https://help.quantumworkplace.com/comments-theme-and-sentiment-text-analytics, Accessed from internet on Apr. 6, 2023, pp. 1-9.

"User Experience Score", Citrix Analytics for Performance, Dec. 15, 2022, 3 pages.

"What is Amazon Comprehend", Available Online at: https://docs.aws.amazon.com/comprehend/latest/dg/how-sentiment.html, 2023, 330 pages.

"What is Net Promoter Score", Available Online at: https://www.hotjar.com/net-promoter-score/, Feb. 23, 2023, 8 pages.

Attravanam, et al., "How to Easily Classify Customer Feedback w/ Machine Learning", Available Online at: https://www.linkedin.com/pulse/how-easily-classify-customer-feedback-w-machine-rohan-attravanam/., Mar. 13, 2018, pp. 1-5.

Bhargava, et al., "Neural Network-Based Architecture for Sentiment Analysis in Indian Languages", Available Online at: https://doi.org/10.1515/jisys-2017-0398., Jun. 5, 2018, pp. 1-15.

Gurdin, "User Metrics", Published in VMware Design, Available Online at: https://medium.com/vmwaredesign/user-metrics-fd8e56914321., Mar. 5, 2020, 8 pages.

Makosiewicz, "AARRR Pirate Metrics Framework: What it is & How it Works", Available Online at: https://ahrefs.com/blog/aarrr-metrics-framework/., Mar. 3, 2022, 17 pages.

Mujawar, et al., "Behavior and Feedback Based Trust Computation in Cloud Environment", Journal of King Saud University—Computer and Information Sciences, vol. 34, No. 8, Available Online at: https://doi.org/10.1016/j.jksuci.2020.12.003., Sep. 2022, pp. 4956-4967.

Rahman, et al., "Multi-Tier Sentiment Analysis of Social Media Text Using Supervised Machine Learning", Computers, Materials and Continua, vol. 34, No. 3, Available Online at: 10.32604/cmc.2023.033190., Dec. 2022, pp. 5527-5543.

Rodden, et al., "Measuring the User Experience on a Large Scale: User-Centered Metrics for Web Applications", CHI '10: Proceedings of the SIGCHI Conference on Human Factors in Computing Systems, Apr. 10, 2010, pp. 2395-2398 Continua, vol. 34, No. 3, Available Online at: 10.32604/cmc.2023.033190., Dec. 2022, pp. 5527-5543.

U.S. Appl. No. 18/485,233, "Non-Final Office Action", Oct. 5, 2026, 34 pages.

Liu, et al., "Exploratory Undersampling for Class-Imbalance Learning", Institute of Electrical and Electronics Engineers Transactions on Systems, Man, and Cybernetics, Part B (Cybernetics), vol. 39, No. 2, 10.1109/TSMCB.2008.2007853, 2009, 14 pages.

* cited by examiner

GENERATING A UNIFIED USER EXPERIENCE SCORE USING SENTIMENT ANALYSIS AND THEME CLASSIFICATION

BACKGROUND

Cloud computing environments are large and complex systems that include many different components and related products/services. With growing amounts of data, organizations, such as cloud service providers (CSPs) must gain more insights about their data that relate to a user's journey in association with the CSP. While some insights can be obtained from queries, surveys, or some other data, more insights are needed to obtain a true understanding of the user's journey. Currently, user experience (UX) can be attempted to be measured for individual products/services utilizing existing frameworks such as the HEART (Happiness, Engagement, Adoption, Retention, and Task success) framework and the USER (Usage, Satisfaction, Ease-of-use and Ramp-up) framework. These existing frameworks, however, are unable to measure an overall user experience within a cloud computing environment, much less track and quantify a user's journey within the cloud computing environment. For example, a journey from initial engagement to becoming a customer of a cloud service provider.

BRIEF SUMMARY

The present disclosure relates generally to techniques for generating a unified user experience (UX) score using sentiment analysis and theme classification, training multiple layers of a machine learning environment to perform sentiment analysis and theme classification, and arranging layers of a machine learning environment based on noise from training data. More particularly, novel techniques are described for generating a unified UX score that is indicative of a user's journey in association with the cloud service provider. In some examples, the unified UX score is computed by combining scores generated from different categories that are associated with at least a portion of the user experience. According to some configurations, the categories include, but are not limited to, a happiness category, and adoption category, a mindshare category, a success of tasks category, an engagement category, and a retention category. In some examples, scores generated for the individual categories contribute a predetermined percentage of the unified UX score indicative of the user's journey in association with the cloud service provider. Various embodiments are described herein to illustrate various features. These embodiments include various methods, systems, non-transitory computer-readable storage media storing programs, code, or instructions executable by one or more processors, and the like.

At least one embodiment is directed to a computer-implemented method. The method can include determining, via one or more processors, user feedback data, wherein the user feedback data includes first user feedback data that is obtained from at least one of one or more computing devices of a cloud service provider (CSP), and second user feedback data that is obtained from one or more external computing devices associated with at least one of a social network, a messaging service, an Internet forum, or a chat room; determining, via the one or more processors, metrics associated with categories including a mindshare category, a happiness category, and one or more other categories that include at least one of an adoption category, a success of tasks category, an engagement category, or a retention category; generating, via the one or more processors, a happiness score based, at least in part on the first user feedback data, wherein the happiness score indicates responses to one or more products of the CSP, one or more services of the CSP, or one or more features of the CSP; generating, via the one or more processors, a mindshare score based, at least in part on the second user feedback data, wherein the mindshare score indicates responses to one or more products of the CSP, one or more services of the CSP, or one or more features of the CSP; generating, via the one or more processors, one or more other scores for individual ones of the one or more other categories; generating a unified user experience (UX) score, via the one or more processors, based at least in part on the happiness score, the mindshare score and the one or more other scores, wherein each category associated with the scores contributes a predetermined percentage of the unified UX score; and causing information about the unified UX score to be provided to a computing device associated with a user.

Another embodiment is directed to a system comprising one or more processors and instructions that, when executed by the one or more processors, cause system to perform any suitable combination of the method(s) disclosed herein.

Still another embodiment is directed to a non-transitory computer-readable medium storing computer-executable instructions that, when executed by one or more processors of a computing cluster, cause the computing cluster to perform any suitable combination of the method(s) disclosed herein.

The foregoing, together with other features and embodiments will become more apparent upon referring to the following specification, claims, and accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
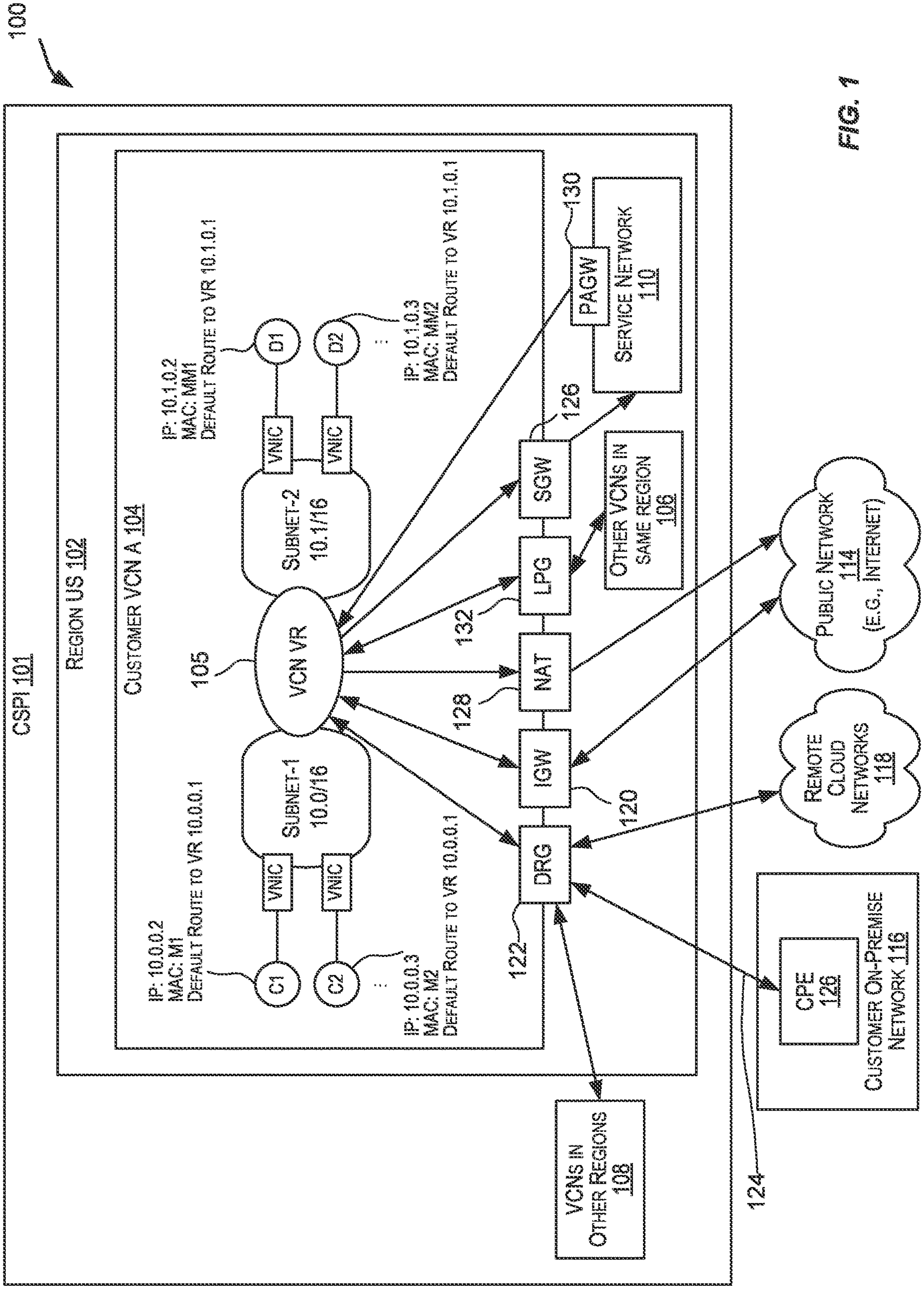
FIG. 1 is a high-level diagram of a distributed environment showing a virtual or overlay cloud network hosted by a cloud service provider infrastructure according to certain embodiments.

In the following description, for the purposes of explanation, specific details are set forth to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to techniques for generating a unified user experience (UX) score using sentiment analysis and theme classification, training multiple layers of a machine learning environment to perform sentiment analysis and theme classification, and arranging layers of a machine learning environment using noise from training data. More particularly, novel techniques are described for generating a unified UX score that is indicative of a user's journey in association with the cloud service provider. In some examples, the unified UX score is computed by combining scores generated from different categories that are associated with at least a portion of the user experience. According to some configurations, the categories include, but are not limited to, a happiness category, and adoption category, a mindshare category, a success of tasks category, an engagement category, and a retention category. In some examples, scores generated for the individual categories contribute a predetermined percentage of the unified UX score indicative of the user's journey in association with the cloud service provider.

Novel techniques are also described for training multiple layers of a machine learning environment to perform sentiment analysis and theme classification. Using techniques described herein, sentiment analysis is performed on feedback data that includes user-submitted feedback (e.g., user feedback that is sent directly to the cloud service provider) to generate a happiness score and on external user feedback (e.g., feedback that is submitted to a third-party service such as a social media platform) to generate a mindshare score. The sentiment analysis is performed by a machine learning environment that takes feedback as input and outputs a positive, neutral, or negative value (e.g., −1, 0, 1) indicative of a negative, neutral, or satisfied sentiment (respectively). The sentiment scores generated for the individual instances of the feedback can be averaged to obtain an overall sentiment feedback score (e.g., an integer value between −1 and 1).

Novel techniques are also described for performing theme analysis using a trained machine learning environment for individual instances of the feedback. In some examples, the sentiment analysis score may be adjusted based on a predetermined weight associated with each of the different themes. In this way, feedback associated with different themes can have more/less impact on the happiness score and/or the mindshare scores generated using sentiment analysis.

Novel techniques are also disclosed for training layers of a machine learning environment. Using techniques described herein, a single machine learning model is trained that has multiple layers, or a system of multiple models is trained, to perform analysis (e.g., sentiment analysis, theme classification, . . . ), where each layer (or individual model) is configured to predict a binary outcome. In some examples, a first layer of a machine learning environment for sentiment analysis and a first layer for theme classification is trained to take a textual string as input and produce a first binary output. Next, instances of training data having a value of one are removed from the group of training data to create a modified group of training data. A second layer of the machine learning environment may then be trained to take a textual string as input and produce a second binary output. After training, sentiment and theme classification analysis may then be performed. Although multiple layers of a single model can be used, each layer may be represented by an individual model that produces a binary output. The training data can also be preprocessed to determine a value for each classification (e.g., each theme, etc.) that represents an amount of noise caused by training data having that classification and using these values to determine an order in which a machine learning environment performs classification.

Novel techniques are also disclosed for determining a layer order of a machine learning environment based on noise generated from training data. In some examples, the training data used to train a machine learning model is analyzed by a dataset pre-processor to determine an amount of noise caused by a portion of training data associated with a classification value (e.g., a theme value associated with a particular theme for a theme classification model). Determining the amount of noise caused by training data having a classification value can include a model training agent determining a data entropy value for the training data having the predetermined value. The values may be organized in a list, starting with a theme value that creates the largest amount of noise during classification (when compared to the other theme values) and ending with a theme value that creates the smallest amount of noise during classification (when compared to the other theme values).

As the number of customers of a cloud service provider (CSP) and network functions grow within a cloud computing environment, the amount of data available to be analyzed within a cloud computing environment keeps increasing. With the growing amounts of data, organizations, such as CSPs must gain more insights about their data that relate to a user's journey. Instead of having to manually browse through data and identify various data that may indicate information about user experience of a user, techniques described herein provide more insights that cannot be obtained using manual techniques. Novel techniques described in this disclosure have several advantages over existing techniques. For example, as a result of automated monitoring of different data associated with different metrics, and the use of that data with machine learning techniques, the complexity associated with traditional methods that are used for determining user experience are reduced, thereby saving time and money. Additionally, the amount of resources, such as memory and processing resources, needed to perform the operations described herein within a cloud computing environment is reduced.

FIGS. 1-5 and the associated description provided in the "Example Virtual Networking Architecture" section below describes networking concepts including network virtualization, substrate networks, overlay networks, VNICs, etc., and provides examples of environments in which certain embodiments described in this disclosure may be implemented. FIGS. 6-12 describe examples and embodiments related to the distributed routing techniques described in this disclosure. FIGS. 13-16 depict examples of architectures for implementing cloud infrastructures for providing one or more cloud services, where the infrastructures may incorporate teachings described herein. FIG. 17 depicts a block diagram illustrating an example computer system or device, according to at least one embodiment.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN-IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses (substrate IP addresses) in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 13, 14, 15, and 16 (see references 1316, 1416, 1516, and 1616) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 13, 14, 15, and 16, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 13, 14, 15, and 16 (for example, gateways referenced by reference numbers 1334, 1336, 1338, 1434, 1436, 1438, 1534, 1536, 1538, 1634, 1636, and 1638) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
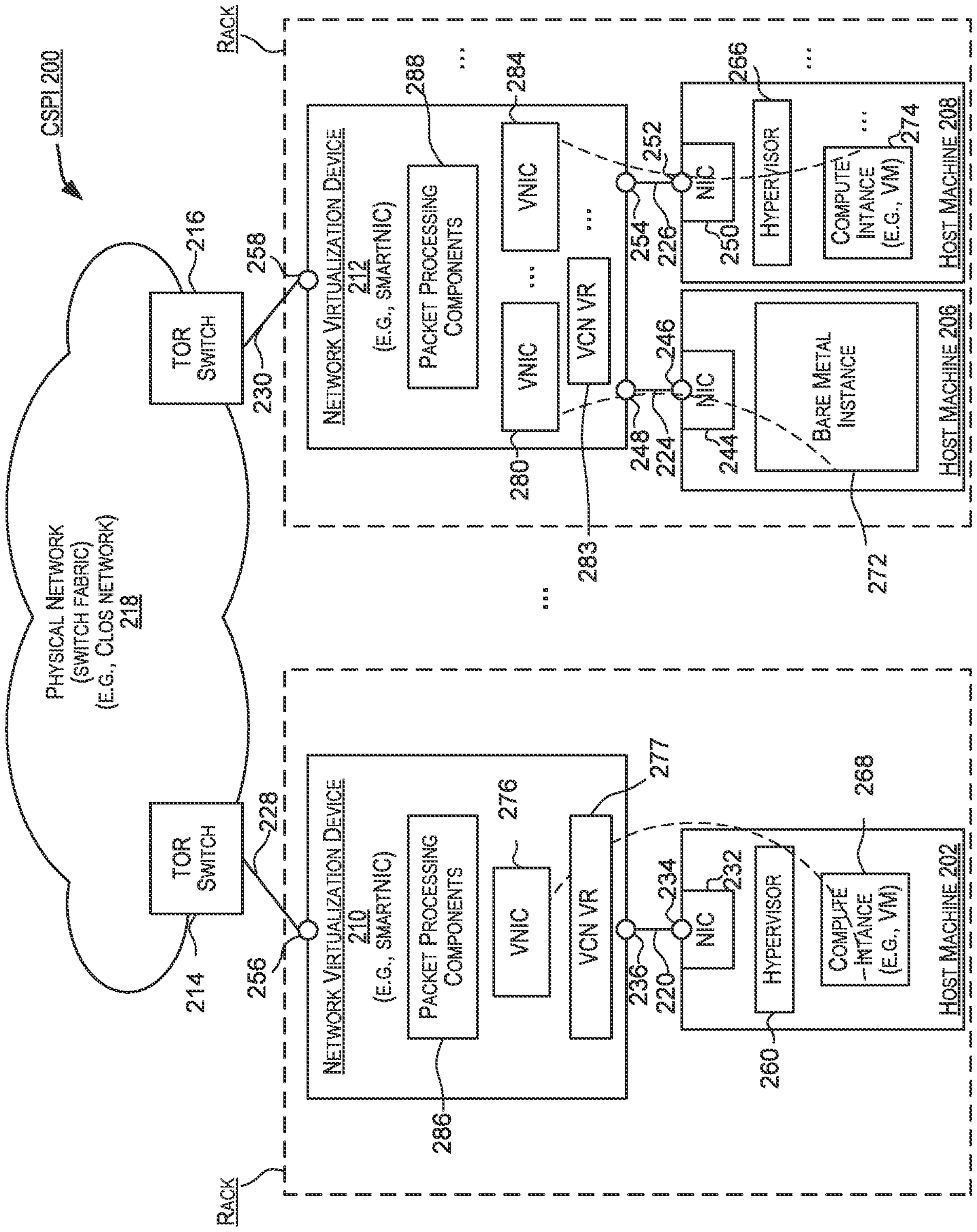
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
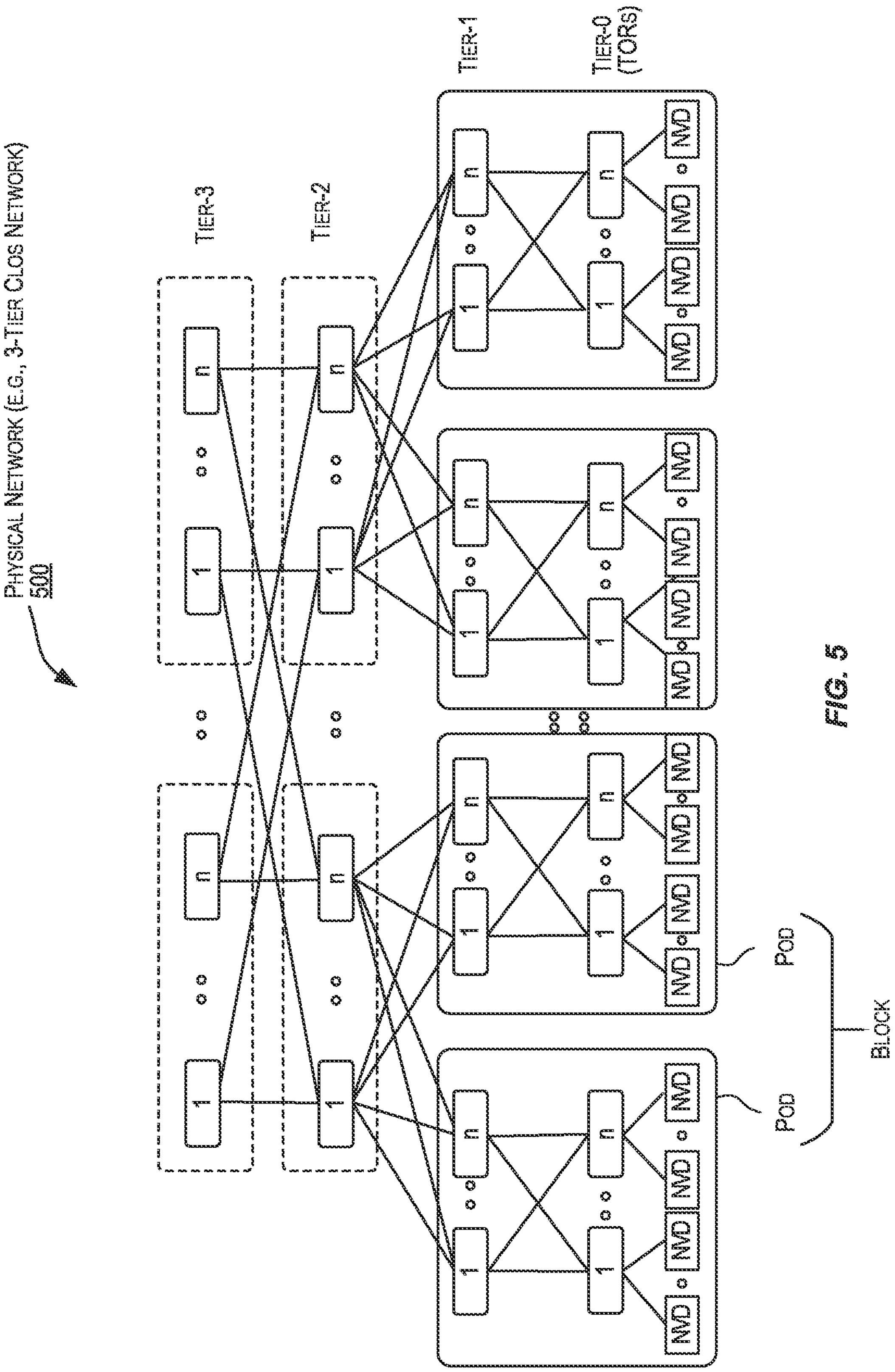
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
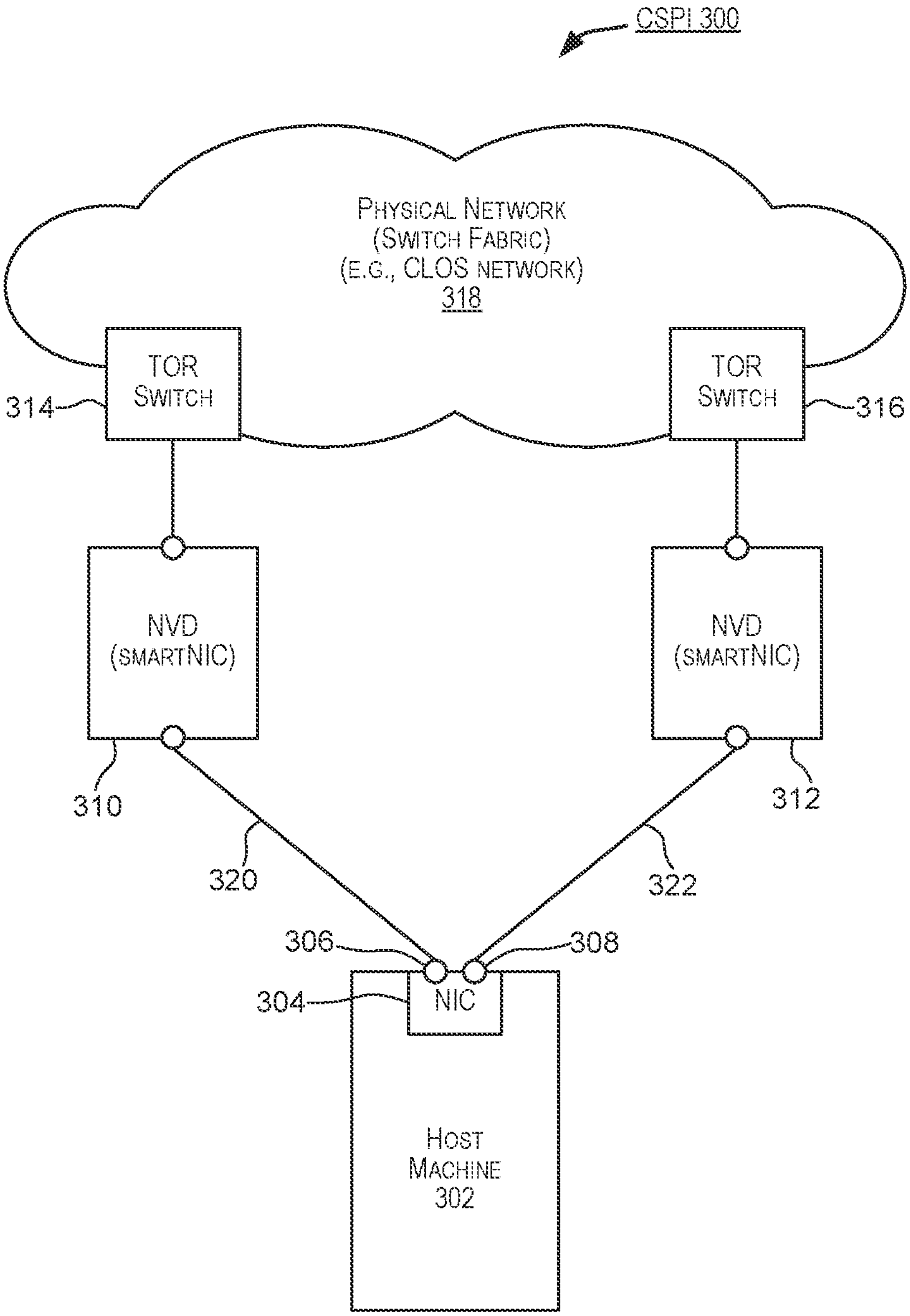
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 13, 14, 20, and 21 (see references 1316, 1416, 2016, and 2116) and described below. Examples of a VCN Data Plane are depicted in FIGS. 13, 14, 20, and 21 (see references 1318, 1418, 2018, and 2118) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
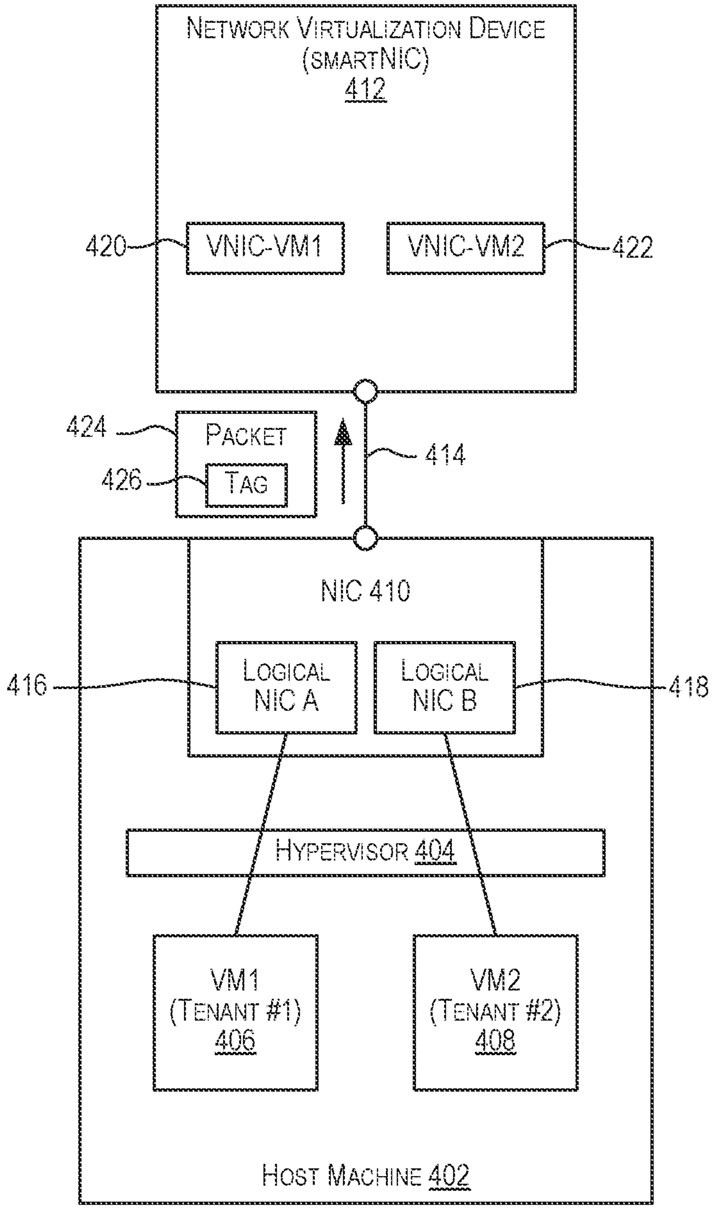
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

Figure 6:
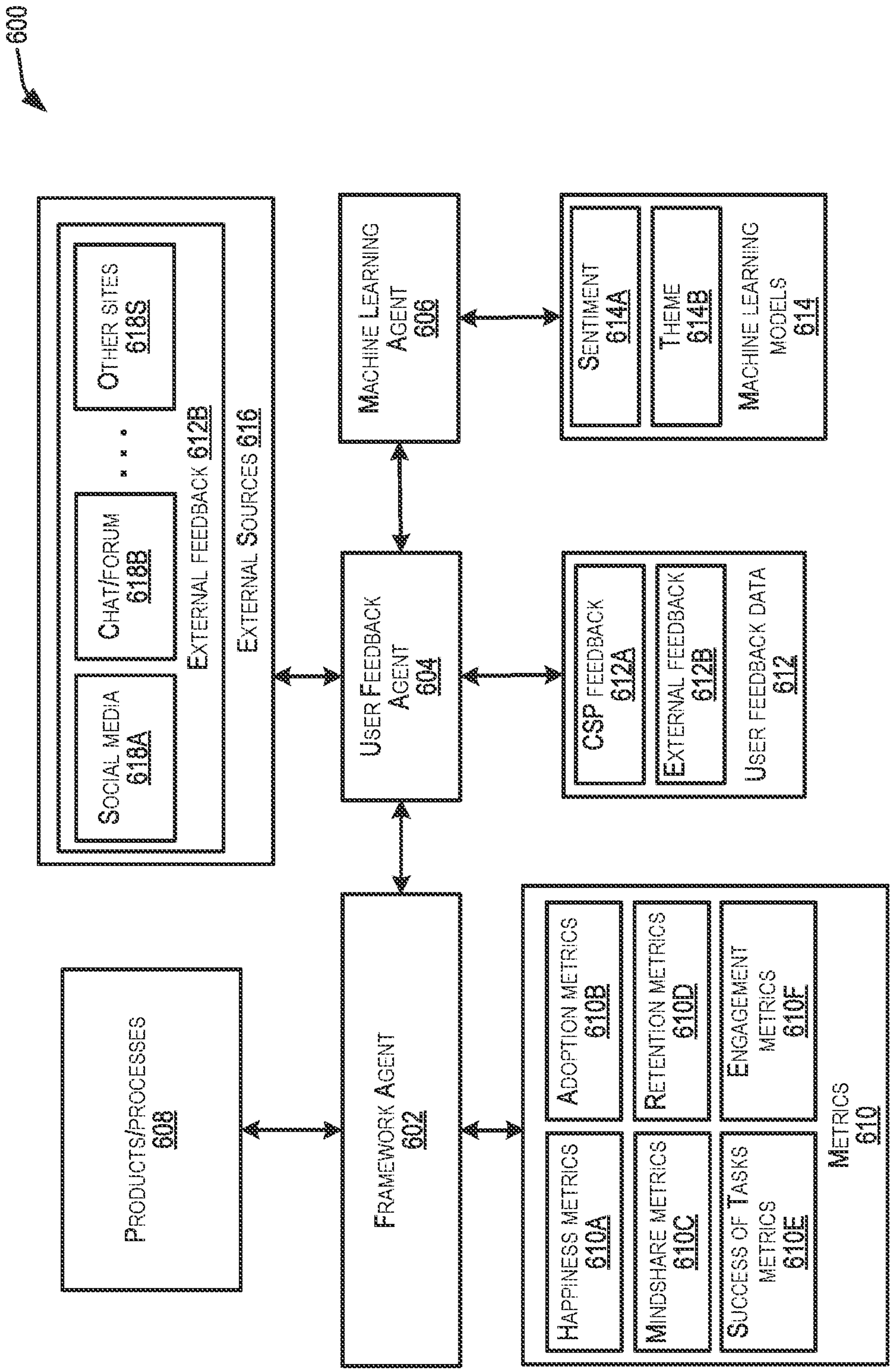
FIG. 6 is a simplified block diagram of an environment illustrating generating an overall user experience score using sentiment analysis and theme classification, training multiple layers of a machine learning environment to perform sentiment analysis and theme classification, and arranging layers of a machine learning environment based on noise from training data, according to certain embodiments.

Journey Score, Sentiment Analysis, Theme Analysis, Machine Learning Model Training and Determining an Order of Layers of a Machine Learning Model Based on Noise Embodiments FIG. 6 is a simplified block diagram of an environment 600 illustrating generating a unified user experience score using sentiment analysis and theme classification, training multiple layers of a machine learning environment to perform sentiment analysis and/or theme classification, and determining an order of layers of a machine learning classification based on noise from training data, according to certain embodiments. Environment 600 comprises multiple systems communicatively coupled to each other. The systems in FIG. 6 include a framework agent 602, a user feedback agent 604, and a machine learning agent 606.

Environment 600 depicted in FIG. 6 is merely an example and is not intended to unduly limit the scope of claimed embodiments. Many variations, alternatives, and modifications are possible. For example, in some implementations, environment 600 may have more or fewer systems or components than those shown in FIG. 6, may combine two or more systems, or may have a different configuration or arrangement of systems. The systems, subsystems, and other components depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

In the embodiments depicted in FIG. 6, novel techniques are described for generating a unified UX score that is indicative of a user's journey in association with the cloud service provider. More particularly, a framework is described that generates a unified UX score by generating and combining scores from different categories, such as, a happiness category, an adoption category, a mindshare category, a success of tasks category, an engagement category, and a retention category. According to some examples, each category contributes a predetermined percentage of a single overall score that is indicative of the user's journey in association with the cloud service provider. In some other examples, not all of the categories may be used to generate a unified UX score. For example, the unified UX score can be calculated from a subset of the categories.

Using techniques described herein, a framework is provided that obtains, generates, and tracks metrics of various components (e.g., operations/interactions within a network associated with a CSP) of a user's journey with respect to a cloud service provider. The framework defines, analyzes, and generates metrics for the different categories. Among other differences, compared to previous frameworks, the framework and techniques described herein includes a mindshare analysis, which addresses user feedback related to different cloud computing environment components such as products, services, branding, and marketing associated with the CSP. In some examples, this user feedback is used to generate an overall mindshare score by averaging individual mindshare scores generated from instances of external feedback 612 obtained from external sources 616 such as social media feedback 618A, chat/forum feedback 618B, and/or feedback from other sites 618S (e.g., comments, posts, threads, . . . ). In these examples, the external feedback 612 is submitted by users to one or more platforms/services that are not associated with the CSP.

According to some examples, a framework agent 602 performs operations associated with generating the unified UX score associated with a system/suite of products, features, and/or services, or an individual product, feature, and/or service that is associated with/hosted by a cloud service provider (CSP). As briefly discussed above, in some examples, scores generated for six different categories contribute to the unified UX score that include a happiness category, an adoption category, a mindshare category, a success of tasks category, an engagement category, and a retention category.

According to some configurations, the framework agent 602 monitors different products/processes performed within a network provided/associated with a cloud service provider, obtains user feedback that includes CSP feedback 612A (e.g., user feedback obtained directly from one or more processors of the computer service provide network), and external feedback 612B (e.g., obtained from external sources 616), determines/generates metrics from the monitored data and user feedback data 612, generates scores for the different categories, and generates the unified UX score based on the scores for the different categories. In some examples, the framework agent 602 uses a machine learning agent 606 that applies different machine learning models (e.g., a sentiment model 610A, and a theme model 610B) to assist in generating a portion of the individual scores for the categories, and/or generating the unified UX score. According to some configurations, each category comprises a predetermined percentage of the unified UX score. For example, if the unified UX score has a 100-point total possible value, each category score may contribute a predetermined number of those points (e.g., 16). In other examples, categories can be weighted differently to determine the unified UX score. For example, one or more of the different scores can have different weights.

In some configurations, the framework agent 602, or some other component/device can determine/generate a variety of different metrics 610 that are used to calculate the different scores and the unified UX score. The framework agent 602 may obtain metrics 610 using different techniques, such as monitoring different components/processes within a network, accessing data from internal/external data sources, and the like. The metrics 610 can include, but are not limited to happiness metrics 610A, adoption metrics 610B, mindshare metrics 610C, retention metrics 610D, success of tasks metrics 610E, and engagement metrics 610F. Each of the metrics 610A-610F can be one or more different metrics that make up the metrics for a particular category.

For example, the metrics 610 can indicate what users are adopting a product, what features the customers are using, when a user adopts the product/feature, how long does a user keep using the product, how often is a product/feature used, a churn rate metric (e.g., how many customers stop using a product/feature compared to total number of customers), an average session duration metric, a product recommendation rate metric (e.g., what percentage of customers recommend the product), a customer satisfaction metric, a task completion time, a number of steps used to complete a task, a task success rate (e.g., how many customers successfully complete a task), an ease-of-use metric, a number of tickets generated metric, and the like. In some examples, the metrics 610 can include metrics associated with organizational engagement, as well as individual engagement. According to some configurations, a unified UX score can be generated for an organization and/or individuals. In this way, a CSP can determine user experience for an entire organization, or a subset of the organization.

Some adoption metrics 610B that can be monitored/generated by the framework agent 602 to use in generating the adoption score can include, but are not limited to a conversion rate metric (e.g., how many users look at the product versus how many of those users begin using the product), an overall adoption rate metric (e.g., customers using a feature as a percentage of the total number of customers for the product), a time to adopt metric, and/or one or other metrics.

Some retention metrics 610D determined/generated by the framework agent 602 can include, but not limited to a customer retention rate metric (e.g., number of customers at the end of a period compared to the number of customers at the beginning of the period), a repeat purchase rate metric, a churn rate metric, an average churn time, a customer satisfaction metric, and the like.

Engagement metrics 610F determined/generated by the framework agent 602 can include, but are not limited to metrics such as user activity metrics (e.g., daily, weekly, monthly engagement), time using product/feature metrics, stickiness metrics (e.g., how often does user return to the product), retention metrics, churn metrics, use of feature metrics, feedback response rates, ticket generation metrics, and the like. Success of tasks metrics 610D can include, but not limited to metrics such as engagement metrics, completion of task metrics, user feedback metrics, and the like. Happiness metrics 610A and mindshare metrics 610 can include metrics such as, but not limited to user feedback metrics, and the like.

In some configurations, the framework agent 602 generates a score for each of the different categories. For example, the framework agent 602 may access adoption metrics 610B to generate an adoption score, access retention metrics 610D to generate a retention score, access success of tasks metrics 610D to generate a success of tasks score, access engagement metrics 610F to generate an engagement score, access happiness metrics 610A to generate a happy score, and access mindshare metrics 610C to generate a mindshare score.

The adoption score generated by the framework agent 602 provides an indication of how many customers/organizations have chosen to use a particular service/product/feature compared to an overall number of customers. In some examples, the adoption metrics 610B may be specific to an individual feature provided by a service/product and/or may relate to adoption of a product or service itself. In some examples, the adoption metrics 610B may be specific to an individual customer, a group of customers, an organization, a subset of an organization, and the like According to some configurations, the framework agent 602 can monitor the use of the feature/service/product and/or access to the feature/service/product to identify adoption of the feature/service/product.

The retention score generated by the framework agent 602 provides an indication of a frequency of customer/organization returning to use a particular feature/service/product. The retention metrics 610D may be specific to an individual feature provided by a service/product and/or may relate to adoption of a product or service itself. In some examples, the retention metrics 610D may be specific to an individual customer, a group of customers, an organization, a subset of an organization, and the like. According to some configurations, the framework agent 602 can monitor the use of the feature/service/product and/or access to the feature/service/product to identify retention metrics 610D. The framework agent 602 can generate a retention score using one or more retention metrics 610D, such as a retention rate metric (e.g., number of customers at the end of a period compared to the number of customers at the beginning of the period), a repeat purchase rate metric, a churn rate metric, an average churn time, a customer satisfaction metric, and the like.

The engagement score generated by the framework agent 602 provides an indication of a level of engagement for a particular feature/service/product. The engagement metrics 610F may be specific to an individual feature provided by a service/product and/or may relate to engagement of a product or service itself. In some examples, the engagement metrics 610F may be specific to an individual customer, a group of customers, an organization, a subset of an organization, and the like. According to some configurations, the framework agent 602 can monitor the use of the feature/service/product and/or access to the feature/service/product to identify engagement metrics 610F. The framework agent 602 can generate an engagement score using one or more engagement metrics 610F, such as user/organization activity metrics (e.g., daily, weekly, monthly engagement), time using product/feature metrics, stickiness metrics (e.g., how often does user return to the product), churn metrics, use of feature metrics, feedback response rates, ticket generation metrics, and the like.

The success of tasks score generated by the framework agent 602 provides an indication of the user-friendliness for a particular feature/service/product. The success of tasks metrics 610E may be specific to an individual feature provided by a service/product and/or may relate to the user-friendliness of a product or service itself. In some examples, the success of tasks metrics 610E may be specific to an individual customer, a group of customers, an organization, a subset of an organization, and the like. According to some configurations, the framework agent 602 can monitor the use of the feature/service/product and/or access to the feature/service/product to identify success of tasks metrics 610E. The framework agent 602 can generate a success of tasks score using one or more success of tasks metrics 610E metrics, such as task completion times, number of steps metrics (e.g., the number of steps it took a customer to complete a task compared to the optimal number of steps), user feedback metrics, and the like.

In some examples, the user feedback agent 602 uses user feedback data 612, and one or more machine learning models 614 to generate the happiness score, and the mindshare score. According to some configurations, the user feedback agent 604 interacts with user-feedback data 612 that is associated with a predetermined time period (e.g., a week/month/year). As illustrated, the user-feedback data 612 may include CSP feedback 612A, and external feedback 612B. The feedback data 612 may include textual data (e.g., one or more text strings), audio data and/or other data that indicates user sentiment (e.g., associated with a service, product, feature, service provider, . . . ).

Feedback data 612 can come from different sources, such as but not limited to electronic messages, social media, tickets, reviews, and the like. Feedback data 612 can also be solicited (e.g., asking a user to fill out a questionnaire, a poll, . . . ) or unsolicited. Unsolicited feedback received from customers may, in some cases, provide a better indication of customer happiness or unhappiness. The volume of feedback data 612 can also be used as a metric 610 (e.g., more feedback indicates more interaction).

As will be discussed in more detail below, the framework agent 602 can generate a happiness score based on user feedback data 612, such as CSP feedback 612A, that is sent directly to the CSP. In some examples, the framework agent 602 uses machine learning agent 606 to perform sentiment analysis on instances of CSP feedback 612A using a machine learning environment that employs a sentiment model 614A to generate a happiness score for each instance of CSP feedback 612A that is within a predetermined time frame. According to some examples, the generated happiness scores may include a positive, neutral, or negative value (e.g., −1, 0, 1) indicative of a negative, neutral, or satisfied sentiment (respectively). In other examples, a different scoring scale can be used (e.g., 1 to 10, 1 to 100, more/less classifications, . . . ). According to some configurations, after generating the sentiment scores, the framework agent 602 may determine an average for the generated happiness scores to obtain an overall happiness score (e.g., an integer value such as −1, 0, and 1) for a particular service/product/feature.

After determining the happiness score, the framework agent 602 may determine how much happiness category points contribute to the unified UX score. In some examples, the framework agent 602 may multiply the average happiness score (e.g., 0.7) by the maximum contribution value for the happiness category (e.g., 16 points) to determine the overall contribution of the happiness score to the unified UX score (e.g., 16*0.7=11.2).

To determine the mindshare category score, user feedback data 612, such as external feedback 612B, is gathered/accessed and analyzed by the user feedback agent 604, machine learning agent 606, framework agent 602, or some other component/device to generate a mindshare score. Generally, mindshare, refers to a perception of a company to other companies (e.g., a score that approximates the perception of the cloud service provider to other cloud service providers). In some examples, the framework agent 602 generates a mindshare score by performing sentiment analysis on the external feedback 612B that is sent to or created on a service/platform other than the cloud service provider's platform over a predetermined time period. In some configurations, external feedback 612B is obtained by the user feedback agent 604 by crawling publicly available outlets, such as social media websites, and retrieving feedback including one or more key words linked to the companies/products/services that are associated with a particular mindshare score.

In some examples, mindshare scores are generated for individual instances of the external feedback 612B. Similar to how the sentiment analysis is performed to generate happiness scores, the framework agent 602 causes sentiment analysis to be performed on the instances of external feedback 612B using a machine learning environment that employs a sentiment model 614A to obtain a mindshare score for each instance of external feedback 612B. In some examples, the machine learning agent 606 generates, using the sentiment model 614A, a score for each of the instances of external feedback 612B. According to some examples, each mindshare score may include a positive, neutral, or negative value (e.g., −1, 0, 1) indicative of a negative, neutral, or satisfied sentiment (respectively). In other examples, a different scoring scale can be used (e.g., 1 to 10, 1 to 100, more/less classifications, . . . ).

According to some configurations, the framework agent 602 determines an average for the generated mindshare score to determine an overall mindshare score (e.g., an integer value such as −1, 0, and 1). The framework agent 602 can then generate the mindshare score points that contribute to the unified UX score. For example, to determine the overall contribution of the mindshare score, the overall mindshare score (e.g., 0.8) can be multiplied by the maximum contribution value for the mindshare category (e.g., 16 points) to the overall value (e.g., 16*0.8=12.8).

According to some examples, the framework agent 602 may cause the machine learning agent 606 to determine a theme for the instances of user feedback data 612. Many different themes may be associated with the feedback data 612. For example, a first theme value of "authentication" may indicate one or more authentication functions, a second theme value of "interface" may indicate one or more interface functions, a third theme value of "database" may indicate one or more database functions, and the like. As another example, a first theme value may indicate use of a particular feature, a second theme value may indicate use of a service/product, a third theme value may indicate happiness with a feature/service/product, and the like. A predetermined group of theme values may be provided by one or more users.

In some configurations, the framework agent 602 causes the machine learning agent 606 to perform theme classification using a trained theme model 614B, to generate theme classifications. According to some examples, theme classification is performed for each of the instances of feedback data 612. In some cases, the theme classification may then be used to adjust the sentiment analysis score for the instance of the feedback data 612 based on the identified theme. According to some configurations, each of the themes may be associated with a predetermined weight, and the sentiment analysis score may be adjusted based on this weight. For example, if an instance of feedback has a sentiment score of 1, and a theme having a weight of 0.8 is determined for the instance of feedback, the adjusted sentiment score for the instance of feedback is (1)*(0.8)=0.8.

After the scores are generated by the framework agent 602 for the different categories, all or a portion of the individual scores are used by the framework agent 602 to generate a unified UX score. In some examples, the different scores can be added together to determine a unified UX score. For instance, the unified UX score that includes a happiness score of 12, an adoption 8, a mindshare score of 10, a success of tasks score of 15, an engagement score of 13, and a retention score of 16 would be 12+8+10+15+13+16, or 74. In other examples, some other scoring techniques can be used.

The individual scores and/or the unified UX score can then be provided for display to a computing device associated with a user. The scores may be visually presented (e.g., charts, graphs, or some other visual representation. In some configurations, the individual scores may be shown as portions of the bar graph that combine to form the unified UX score. In this particular example, in response to selecting a portion of the bar graph associated with a score for a category, a summary of the score computed for that category may be presented within a user interface (UI), such as a graphical user interface (GUI). More/fewer details can be provided based on the score that is indicated. For instance, if the category is a happiness or mindshare score (or any other category computed utilizing sentiment analysis and/or theme analysis), the summary may include details of each of positive, neutral, and negative feedback collected for the category. In response to determining a selection of one of the categories of feedback (positive, neutral, and negative feedback), specific textual feedback data from that feedback category may be presented. Scores for each specific product and/or service may also be individually presented upon selection of the unified UX score. Many other configurations are possible, and the examples are merely illustrative.

Figure 7:
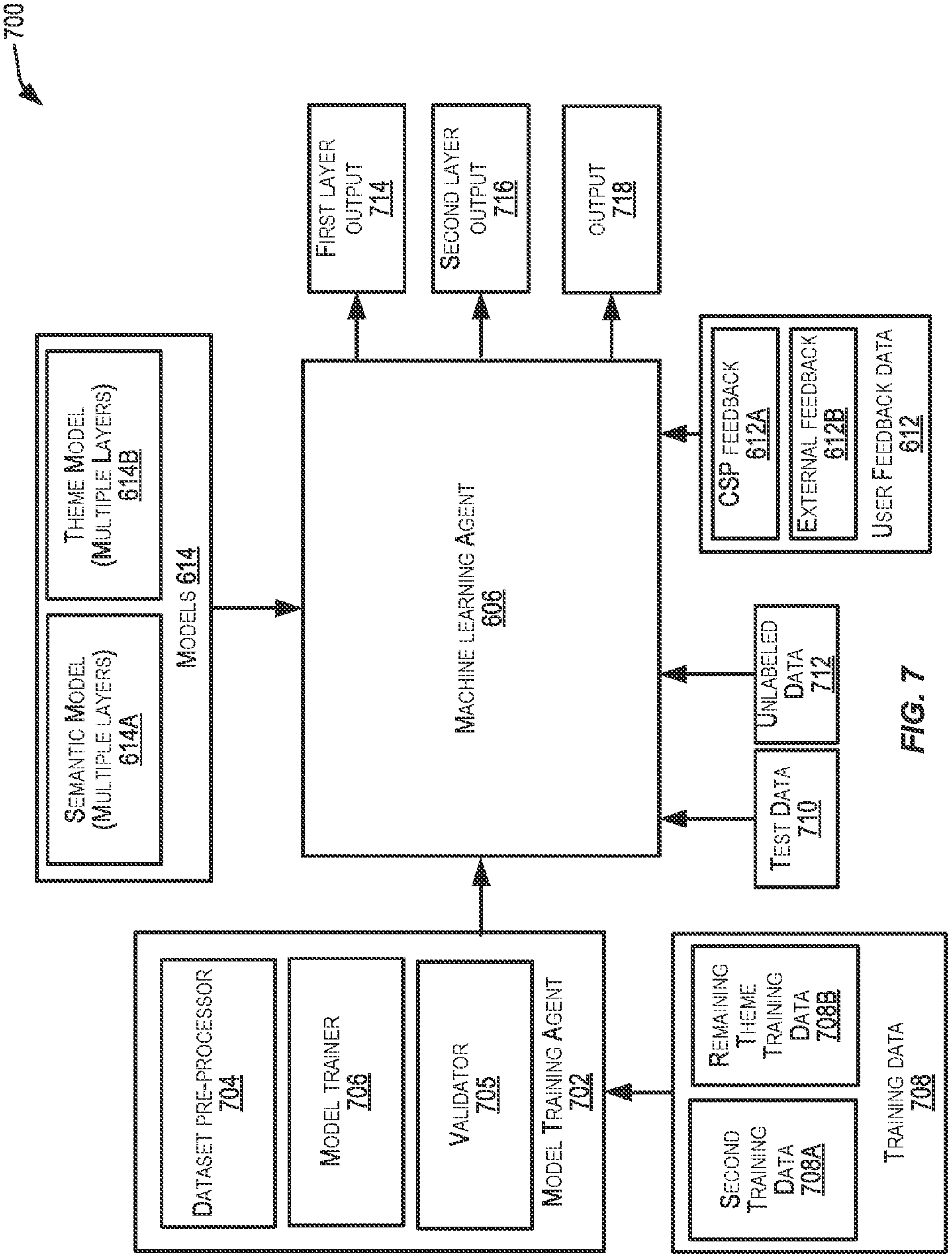
FIG. 7 is a simplified block diagram of an environment illustrating training and using machine learning models for sentiment analysis and theme classification, according to certain embodiments.

FIG. 7 is a simplified block diagram of an environment 700 illustrating training and using machine learning models 614 for sentiment analysis and theme classification, according to certain embodiments. Environment 700 comprises multiple systems communicatively coupled to each other. The systems in FIG. 7 include a machine learning agent 606, and a model training agent 702.

Environment 700 depicted in FIG. 7 is merely an example and is not intended to unduly limit the scope of claimed embodiments. Many variations, alternatives, and modifications are possible. For example, in some implementations, environment 700 may have more or fewer systems or components than those shown in FIG. 7, may combine two or more systems, or may have a different configuration or arrangement of systems. The systems, subsystems, and other components depicted in FIG. 7 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As illustrated, In the embodiment depicted in FIG. 7, novel techniques are described for training machine learning models 614 and performing sentiment analysis and theme classification using the models 614. Using techniques described herein, sentiment analysis and theme analysis can be performed on user feedback data 612 that can be sent directly to the cloud service provider (e.g., CSP feedback data 612A), or obtained from external services/providers (e.g., external feedback data 612B) over a predetermined time period.

As discussed above, semantic analysis can be performed using a machine learning model, such as semantic model 614A, that receives instances of feedback data 612 as input and outputs a score (e.g., a positive, neutral, or negative value such as −1, 0, 1) that is indicative of a negative, neutral, or satisfied sentiment with respect to an instance of user feedback that is contained within the user feedback data 612.

Similarly, a theme analysis can be performed using a machine learning model, such as theme model 614B, that receives instances of feedback data 612 as input and outputs a theme. In some examples, the machine learning agent 606 may adjust the sentiment analysis scores based on the determined theme and a weight associated with the theme. In some examples, the determined themes may be presented with their associated sentiment analysis score.

Many times, when training a machine learning model 614 to be used within a machine learning environment to perform sentiment analysis and/or theme classification, only a small amount of training data 708 may be available. According to some examples, a model training agent, such as model training agent 702, divides the model 614 into different layers during training, and structures the training for each layer to optimize performance of the particular model 614.

More specifically, the model training agent 702 identifies the portion of training data 708 that can be used to train a particular model 614. For example, the training data 708 may include a portion of training data to train a semantic model 614A and another portion of training data to train a theme model 614B. In some configurations, each instance of training data 708 includes a textual string (such as an instance of user feedback associated with a product/service and/or a feature submitted by a user). Each instance of training data 708 can also include a numeric value (e.g., a label) that is indicative of a satisfaction rating associated with the instance of the user feedback 612. For example, a numeric value of −1 may indicate a "dissatisfied" satisfaction ranking, a numeric value of 0 may indicate a "neutral" satisfaction ranking (e.g., neither "satisfied" nor "dissatisfied"), and a numeric value of 1 may indicate a "satisfied" satisfaction ranking. Other labels can also be used to indicate the satisfaction rating.

Generally, the model trainer 706 performs processes of determining hyperparameters for the models 614 and performs iterative operations of inputting examples from training data 708 into the models 614 to find a set of model parameters (e.g., weights and/or biases) that minimizes an objective function(s) such as loss or error function for the models. The hyperparameters are settings that can be tuned or optimized to control the behavior of a model 614. Most models 614 explicitly define hyperparameters that control different aspects of the models such as memory or cost of execution. However, additional hyperparameters may be defined and optimized to adapt a model to a specific scenario. For example, the hyperparameters may include the number of hidden units of a model, the learning rate of a model, the convolution kernel width, the number of kernels for a model, the top-K results, N number of beam levels, and the like.

During training of a model 614, or a layer of a model 614, by the model trainer 706, error is calculated as the difference between the actual output 718 and the predicted output. The function that is used to compute this error is known as an objective function (e.g., a loss function or a cost function). Error is a function of internal parameters of the model, e.g., weights and bias. For accurate predictions, the error needs to be minimized. In order to minimize the error, the model parameters are incrementally updated by minimizing the objective function over the training examples training data 708. The objective function can be constructed to measure the difference between the outputs inferred using the models and the ground truth annotated to the samples using the labels. For example, for a supervised learning-based model, the goal of the training is to learn a function "h( )" (also sometimes referred to as the hypothesis function) that maps the training input space X to the target value space Y, $h: X \rightarrow Y$, such that h(x) is a good predictor for the corresponding value of y. Various different techniques may be used to learn this hypothesis function. In some machine learning algorithms such as a neural network, this is done using back propagation. The current error is typically propagated backwards to a previous layer, where it is used to modify the weights and bias values in such a way that the error is minimized. The weights are modified using the optimization function. Optimization functions usually calculate the error gradient, i.e., the partial derivative of the objective function with respect to weights, and the weights are modified in the opposite direction of the calculated error gradient. For example, techniques such as back propagation, random feedback, Direct Feedback Alignment (DFA), Indirect Feedback Alignment (IFA), Hebbian learning, and the like are used to update the model parameters in such a manner as to minimize or maximize this objective function. This cycle is repeated until a minimum of the objective function is reached.

Once a set of model parameters are identified by the model trainer 706, the model, such as semantic model 614A, or theme model 614B, has been trained and a validator 705 can be used to validate the models 614 using validation datasets, such as test data 710. In some examples, the validation process performed by the validator 705 includes iterative operations of inputting the validating datasets into the trained models 614 using a validation technique such as K-Fold Cross-Validation, Leave-one-out Cross-Validation, Leave-one-group-out Cross-Validation, Nested Cross-Validation, or the like to tune the model parameters and ultimately find the optimal set of model parameters. Once the optimal set of model parameters are obtained, a reserved test set of data from the validating datasets are input into the trained models 614 to obtain output, and the output is evaluated versus ground truth values using correlation techniques such as Bland-Altman method and the Spearman's rank correlation coefficients and calculating performance metrics such as the error, accuracy, precision, recall, receiver operating characteristic curve (ROC), etc. In some instances, the obtaining, training, and validating data processes in the system 700 can be repeatedly performed (adjusted) by the model trainer 706 until a predetermined condition is satisfied and a final set of model parameters can be provided by the model trainer 706.

As should be understood, other training/validation mechanisms are contemplated and may be implemented within the system 700. For example, the models 614 may be trained and model parameters may be tuned on datasets from a subset of obtained or filtered datasets and the datasets from a subset of obtained or filtered datasets may only be used for testing and evaluating performance of the models 614. Moreover, although the training mechanisms described herein focus on training new models 614, these training mechanisms can also be utilized to fine tune existing models trained from other datasets. For example, in some instances, a model 614 might have been pre-trained using datasets from one or more different modalities or tasks. In those cases, the models 614 can be used for transfer learning and retrained/validated using the training and validating data as described above.

Training a Machine Learning Environment to Perform Sentiment Analysis

According to some configurations, the model training agent 702 uses the model trainer 706 to train individual layers of a machine learning model, such as semantic model 614A. In some examples, the model trainer 706 trains a first layer of the semantic model 614A and then trains one or more additional layers of the semantic model 614A. In some examples, such as for the semantic model 614A, the model trainer 706 is trained to receive instances of the training data 708 as a textual string and produce a first binary output that indicates whether the textual string has a "satisfied" satisfaction ranking, utilizing the entire group of training data 708.

The machine learning environment 700 may implement a predetermined model, such as a deep learning model, such as a convolutional neural network ("CNN"), e.g., an inception neural network, a residual neural network ("ResNet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier. A model 830 can also be any other suitable machine learning model trained for classification, understanding, or generating, such as a Logistic regression Classifier, a Naive Bayes Classifier, a Linear Classifier, Support Vector Machine, Bagging Models such as Random Forest Model, Boosting Models, Shallow Neural Networks, a Transformer such as Bidirectional Encoder Representations from Transformers (BERT), or combinations of one or more of such techniques—e.g., CNN-HMM or MCNN (Multi-Scale Convolutional Neural Network). The system 700 may employ the same type of model or different types of models for various tasks such as performing sentiment analysis and/or theme classification.

As briefly discussed above, in some examples, the model trainer 702 trains a first layer of the sentiment model 614B using all of the training data 708 that is associated with the sentiment model 614B. During this phase, the model trainer 706 may generate first layer output 714 that includes a first binary output of 1 to indicate that the textual string has a "satisfied"/positive satisfaction ranking, and the first binary output may include a value of 0 to indicate that the textual string does not have a "satisfied" satisfaction ranking (e.g., has an "other" ranking).

According to some examples, after the model trainer 706 identifies the instances of training data 708 that have a "satisfied" satisfaction ranking (e.g., an output value of 1), the dataset pre-processor 704 removes the instances of the training data 708 that were identified as having the "satisfied" satisfaction ranking from the training data 708 to create second training data. This second training data 708A is used by the model trainer 706 to train a second layer of the machine learning environment. The model trainer 706 of the model training agent 702 is trained to receive instances of the second training data 708A as a textual string and produce a second binary output that indicates whether the textual string has a "neutral" or "dissatisfied" satisfaction ranking. In some configurations, training of the semantic model 614A is completed after training the two different layers. In other configurations, the semantic model 614A may be tuned in an attempt to generate better results. For example, as discussed below, the layers of the semantic model 614A can be arranged in a different order.

After training the different layers of the semantic model 614A, sentiment analysis can be performed on one or more instances of unlabeled user feedback data 712, including determining a sentiment score for each instance of unlabeled user feedback 712, utilizing the trained machine learning environment. In some examples, the machine learning agent 606 or the validator 705 can use test data 710 to determine whether the semantic model 614A is trained properly.

Training a Machine Learning Environment to Perform Theme Classification

Similar to sentiment analysis, when training a machine learning environment to perform theme classification, only a small amount of training data 708 may be available. According to some examples, a model training agent, such as model training agent 702, divides the machine learning environment into different layers during trainings, and structures the training for each layer to optimize model performance.

More specifically, the model training agent 702 identifies the training data 708 associated with the theme model 614B. In some configurations, each instance of training data 708 includes a theme value (such as a textual string) indicative of a theme assigned to the instance of training data.

According to some configurations, the model training agent 702 trains a first layer of a machine learning model, such as theme model 614B, and then trains one or more additional layers of the model 614 until there are no more layers to train (e.g., based on number of themes). In some examples, for the theme model 614B, the model trainer 706 of the model training agent 702 is trained to receive instances of the training data 708 as a textual string and produce a first output that indicates that the instances of the training data 708 are identified as a first theme, utilizing the entire group of training data 708 associated with the theme model 614B.

The dataset pre-processor 704 may then remove the portion of the training data 708 that were identified as the first theme to create remaining theme training data 708B that includes the instances of training data identified as the first theme removed. The model trainer 706 then uses the remaining theme training data 708B to train a second layer of the machine learning environment that receives a textual string as input and produces a second binary output that indicates whether the textual string has a second theme value. This process for training the different layers and removing the training data 708 identified as having the particular theme for the layer, continues until the remaining theme training data includes just instances that would have the final theme value. For example, if there 5 theme classifications, then the process would be repeated four times. Stated another way, after training each layer of the machine learning environment to identify a predetermined theme value, instances of training data with that predetermined theme value may be removed from the group of training data until only two theme values remain within the training data. The last layer of the machine learning environment may then be trained to take a textual string as input and produce a binary output that indicates one of the last two theme values, utilizing the training data that includes the only two theme values.

A theme classification for one or more instances of unlabeled user feedback 712 and/or test data 710 may then be determined utilizing the trained machine learning model 614B that includes the different trained layers. As discussed above, these theme values may be used to adjust sentiment scores for the unlabeled user feedback. For example, if an instance of feedback has an analysis score of 1, and a theme is determined for the instance of feedback, the theme including a weight of 0.8, the adjusted analysis score for the instance of feedback may be (1)*(0.8)=0.8. The adjusted sentiment scores may be used to determine a happiness or mindshare category score for the group of unlabeled user feedback.

Pre-Processing Training Data to Arrange Layers of a Machine Learning Model

In some examples, the initial group of training data 708 may be preprocessed to determine an order in which theme values associated with the training data are addressed within the machine learning environment. For example, the group of training data 708 (and corresponding theme values for such training data) may be analyzed by the dataset pre-processor 704, or some other component/device to determine an amount of noise caused by training data with each individual theme value. Determining the amount of noise caused by training data having a predetermined theme value may include the model training agent 702 determining a data entropy value for the training data having the predetermined theme value. The theme values may be organized in a list, starting with a theme value that creates the largest amount of noise during classification (when compared to the other theme values) and ending with a theme value that creates the smallest amount of noise during classification (when compared to the other theme values).

Also, the training of a machine learning model 614, such as the theme model 614B, may be arranged in layers according to the list. For example, the first theme value of the machine learning model 614 may include the first theme value in the organized list of theme values (e.g., the theme value that creates the largest amount of noise during classification). The second theme value of the machine learning model 614 may include the second theme value in the organized list of theme values (e.g., the theme value that creates the second largest amount of noise during classification).

Using the techniques described herein, the framework agent 602 can generate a unified UX score for a cloud service provider that concisely and accurately tracks metrics for various components of a user's journey with respect to the cloud service provider. Additionally, the happiness score and the mindshare score may use sentiment analysis and theme classification that are performed using machine learning environments that are trained in an efficient, optimized manner.

While not explicitly shown, it will be appreciated that the systems 600 and 700 may further include a developer device associated with a developer. Communications from a developer device to components of the systems 600/700 may indicate what types of input data, are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

Techniques for Sentiment Analysis and Theme Classification

FIGS. 8-12 illustrate example flowcharts 800, 900, 1000, 1100, and 1200, depicting methods, according to certain embodiments. The processing depicted in FIGS. 8-12 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 8-12 and described below is intended to be illustrative and non-limiting. Although FIGS. 8-12 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIGS. 8-12 may include a greater number or a lesser number of steps than those depicted in FIGS. 8-12.

In certain embodiments, such as in the embodiments depicted in FIGS. 6, and 7 the processing depicted in FIGS. 9-12 may be performed by any component that is tasked with performing operations relating to generating a unified user experience score using sentiment analysis and theme classification, training multiple layers of a machine learning environment to perform sentiment analysis and theme classification, and arranging layers of a machine learning environment using noise from training data. For example, the processing may be performed by the framework agent 602, the user feedback agent 604, the machine learning agent 606, the model training agent 702, and/or some other device component when performing operations described herein.

Figure 8:
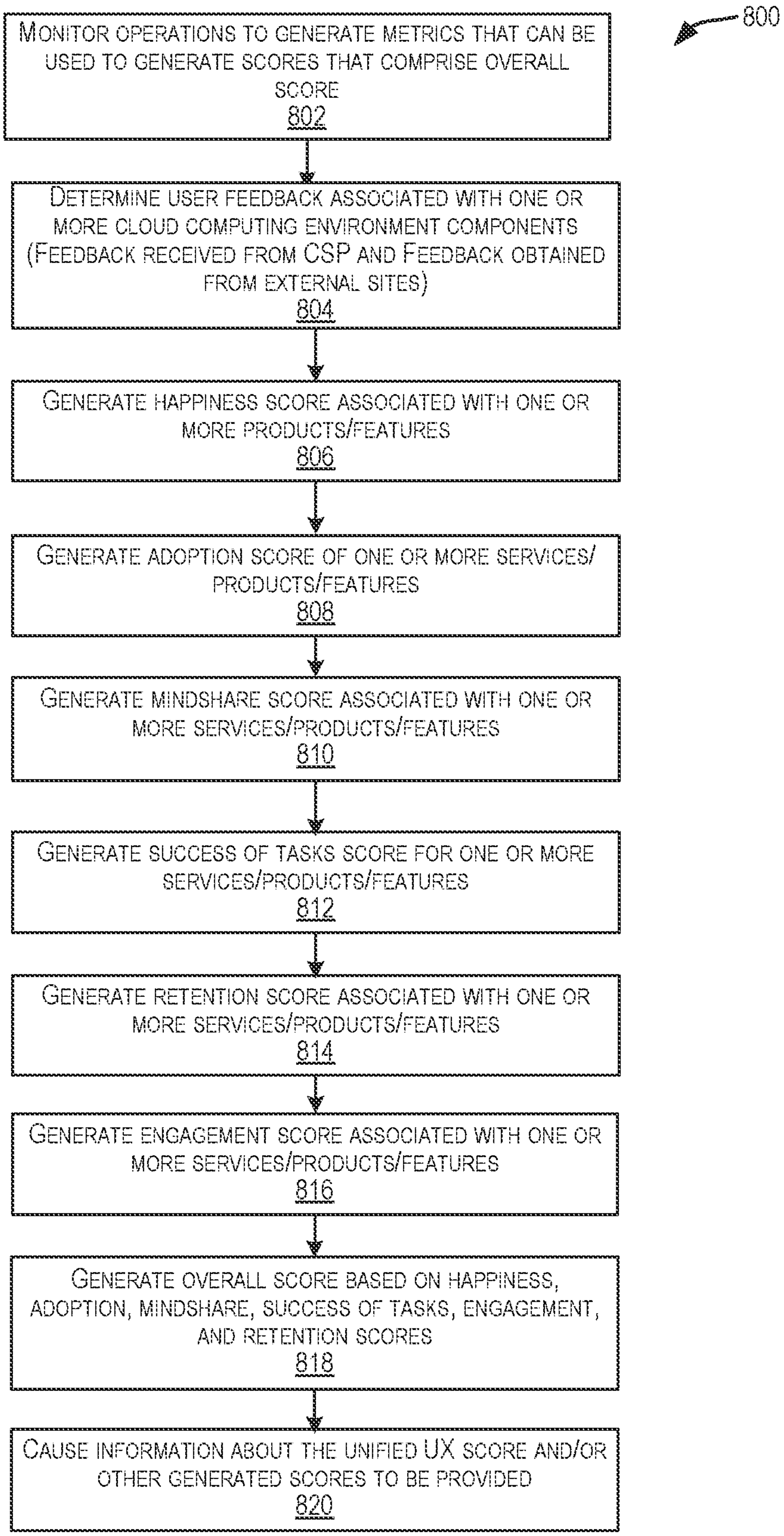
FIG. 8 illustrates an example flowchart depicting a method for generating an overall user experience score indicative of a user's experience and satisfaction in association with a cloud service provider, according to certain embodiments.

FIG. 8 illustrates a flowchart 800 that depicts processing for generating an overall user experience score indicative of a user's experience and satisfaction in association with a cloud service provider.

Processing may begin at 802, where operations within a network associated with a cloud service provider are monitored. As discussed above, the framework agent 602 may obtain/generate metrics 610 using different techniques, such as monitoring different components/processes within a network associated with the CSP, accessing data from internal/external data sources, and the like. The metrics 610 can include, but are not limited to happiness metrics 610A, adoption metrics 610B, mindshare metrics 610C, retention metrics 610D, success of tasks metrics 610E, and engagement metrics 610F.

At 804, user feedback data associated with one more cloud computing environment components are determined. In some examples, the feedback data 612 includes CSP feedback 612A received directly from the CSP, and external feedback 612B that is obtained from one or more external sites. For example, the external feedback 612B may be provided by users of the cloud service provider to an external platform/service, such as a social media service/platform, (other than the cloud service provider's platform), an electronic messaging service/platform, a chat service/platform, a forum service platform, and/or some other service/platform that is not owned or associated with the cloud service provider. According to some examples, the user-feedback data 612 obtained is associated with a predetermined time period (e.g., the last week/month/year). The user-feedback data 612 may include textual data (e.g., one or more text strings), audio data and/or other data that indicates user sentiment.

At 806, a happiness score is generated. As discussed above, the framework agent 602 may cause sentiment analysis to be performed on the instances of the CSP feedback 612A using a machine learning environment that employs a sentiment model 614A to generate a happiness score for each instance of CSP feedback 612A. According to some examples, individual happiness scores may include a positive, neutral, or negative value (e.g., −1, 0, 1) indicative of a negative, neutral, or satisfied sentiment (respectively) that are generated using a sentiment model 614B within a machine learning environment. After generating the individual happiness scores, the framework agent 602 determines the overall happiness score (e.g., by averaging the individual happiness scores). A happiness category points contribution to the unified UX score can also be determined by the framework agent 602.

At 808, an adoption score is generated. As discussed above, the framework agent 602 generates an adoption score from metrics 610, such as adoption metrics 610B. According to some configurations, an adoption score can be generated by the framework agent 602 based on adoption metrics 610B. Generally, the adoption score indicates an adoption rate associated with one or more services/products/features by the CSP.

At 810, a mindshare score is generated. As discussed above, mindshare refers to a perception of a company to other companies (e.g., a score that approximates the perception of the cloud service provider to other cloud service providers). The framework agent 602 may determine the mindshare category score using user feedback data 612, such as external feedback 612B. Similar to the sentiment analysis performed to generate happiness scores, the framework agent 602 causes sentiment analysis to be performed on the instances of external feedback 612B using a machine learning environment that employs a sentiment model 614A to obtain individual mindshare scores.

According to some configurations, the framework agent 602 may determine an average for the generated mindshare scores to obtain an overall feedback score (e.g., an integer value such as −1, 0, and 1). In some examples, the impact of the average mindshare score (e.g., 0.8) can be determined by multiplying the maximum contribution value for the mindshare category (e.g., 16 points) by the average mindshare score.

At 812, a success of tasks score is generated by the framework agent 602. The success of tasks score generated by the framework agent 602 provides an indication of the user-friendliness for a particular feature/service/product. As discussed above, the framework agent 602 can use success of tasks metrics 610E such as task completion times, number of steps metrics, user feedback metrics, and the like to generate the success of tasks score.

At 814, a retention score is generated. As discussed above, the retention score generated by the framework agent 602 provides an indication of a frequency of customer/organization returning to use a particular feature/service/product. Some retention metrics 610D that can be used by the framework agent 602 to generate the retention score can include but are not limited to a customer retention rate metric, a repeat purchase rate metric, a churn rate metric, a customer satisfaction metric, and the like.

At 816, an engagement score is generated. As discussed above, the engagement score generated by the framework agent 602 provides an indication of a level of engagement for a particular feature/service/product. The framework agent 602 can generate an engagement score using one or more engagement metrics 610F, such as user/organization activity metrics, time using product/feature metrics, stickiness metrics, churn metrics, use of feature metrics, feedback response rates, ticket generation metrics, and the like.

At 818, a unified UX score is generated. As discussed above, after scores are generated for the different categories, the individual scores are used to generate a unified UX score. In some examples, the different scores can be added together to determine a unified UX score.

At 820, information about the unified UX score and/or scores is provided. As discussed above, the individual scores and the unified UX score can be provided to a computing device associated with a user. The scores may be visually presented (e.g., charts, graphs, or some other visual representation. In some configurations, the individual scores may be shown as portions of the bar graph that combine to form the unified UX score.

Figure 9:
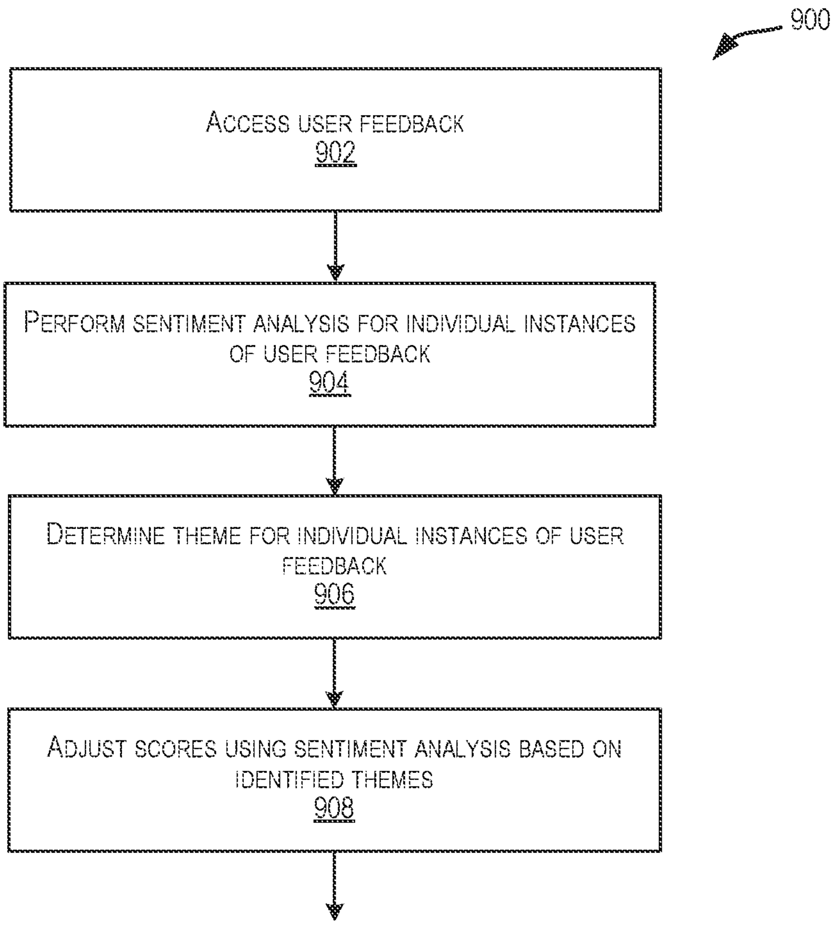
FIG. 9 illustrates an example flowchart depicting a method for performing sentiment analysis, theme classification, and adjusting scores generated using sentiment analysis based on determined themes, according to certain embodiments.

FIG. 9 illustrates flowchart 900 that depicts performing sentiment analysis, theme classification, and adjusting scores generated using sentiment analysis based on determined themes.

Processing may begin at 902, where user feedback data 612 is accessed. As discussed above, the user feedback agent 604 obtains CSP user feedback 612A (e.g., user feedback obtained directly from one or more processors of the computer service provide network, and external feedback 612B obtained from external sources 616, such as from social media services/platforms.

At 904, sentiment analysis is performed on individual instances of user feedback 612. As discussed above, the framework agent 602 may cause sentiment analysis to be performed on the instances of user feedback 612 using a machine learning environment that employs a sentiment model 614A to obtain a score for each of the instances. In some examples, the machine learning agent 606 generates, using the sentiment model 614A, scores for each of the instances of user feedback. In some configurations, the sentiment scores using CSP feedback 612A are associated with happiness scores, and the sentiment scores using external feedback 612B are associated with mindshare scores. According to some examples, the scores may include a positive, neutral, or negative value (e.g., −1, 0, 1) indicative of a negative, neutral, or satisfied sentiment (respectively). In other examples, a different scoring scale can be used (e.g., 1 to 10, 1 to 100, more/less classifications, . . . ).

At 906, a theme can be determined for individual instances of user feedback 612. As discussed above, a theme can be determined for instances of user feedback data. For example, theme classification may be performed utilizing a trained machine learning environment (the way the machine learning environment is trained is illustrated below) that uses one or more models, such as a theme model 614B.

At 908, the sentiment scores used for generating the happiness score and/or the sentiment scores used for generating the mindshare scores can be adjusted based on the identified themes for each of the instance of the user feedback 612. As discussed above, in some configurations, each of the themes may be associated with a predetermined weight, and the sentiment analysis score may be adjusted based on this weight. For example, if an instance of feedback has an analysis score of 1, and a theme is determined for the instance of feedback, the theme including a weight of 0.8, the adjusted analysis score for the instance of feedback may be (1)*(0.8)=0.8.

Figure 10:
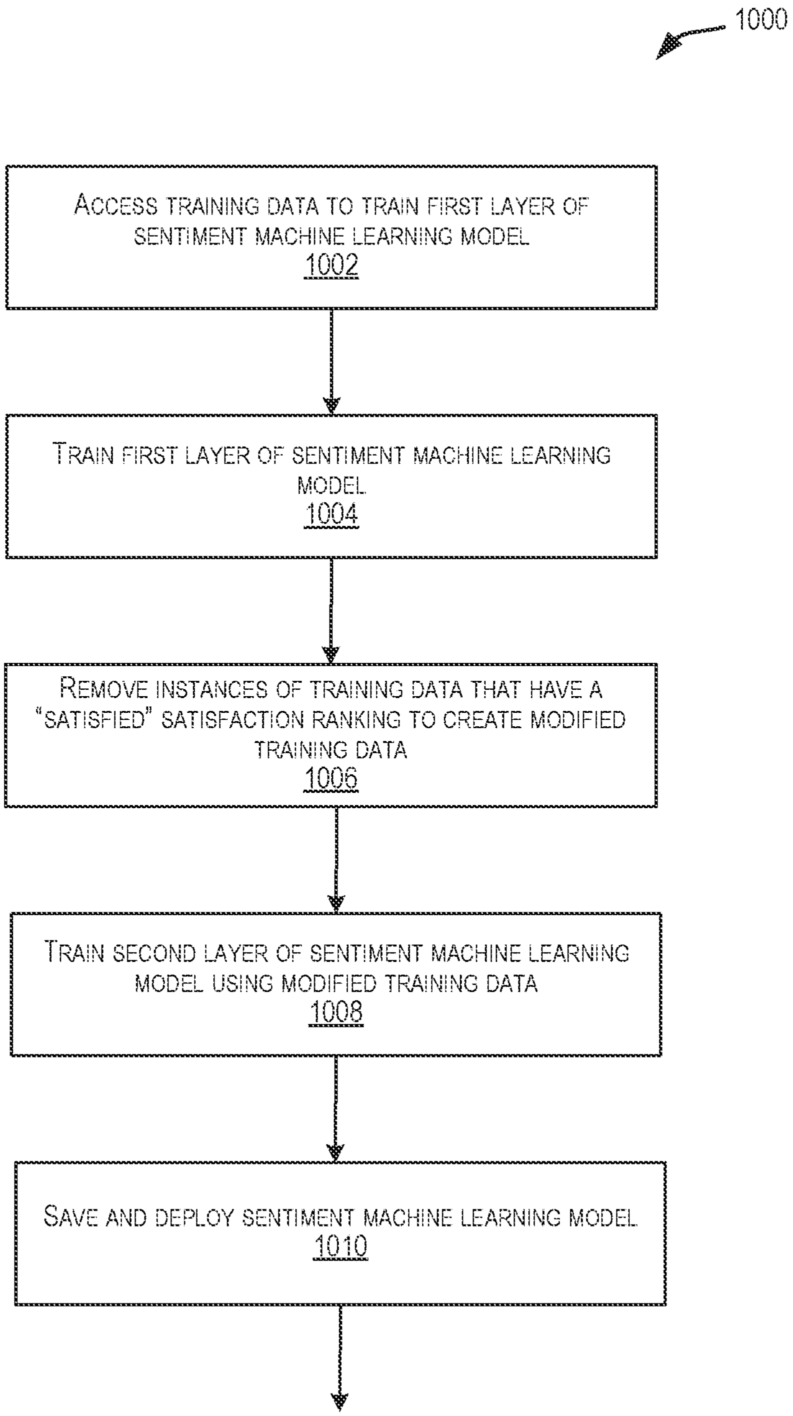
FIG. 10 illustrates an example flowchart depicting a method for training different layers of a sentiment machine learning model, according to certain embodiments.

FIG. 10 illustrates a flowchart 1000 that depicts operations relating to training different layers of a sentiment machine learning model. In some examples, the processing may be performed by the machine learning agent 606, the model training agent 702, and/or some other device component when performing operations described herein related to distributed rate limiting.

Processing may begin at 1002, where training data 708 is accessed to train a first layer of a sentiment model 614A for a machine learning environment. As discussed above, when training a machine learning environment to perform sentiment analysis and/or theme classification, only a small amount of training data 708 is available. According to some examples, a model training agent, such as model training agent 702, divides the machine learning environment into different layers during training, and structures the training for each layer to optimize model performance.

More specifically, in some examples, the model training agent 702 uses the portion of training data 708 that is associated with training a sentiment model 614A. In some configurations, each instance of training data 708 includes a textual string (such as an instance of user feedback for a product/service and/or a feature submitted by a user). Each instance of training data 708 can also include a numeric value (e.g., a label) that is indicative of a satisfaction rating associated with the instance of the user feedback 612. For example, a numeric value of −1 may indicate a "dissatisfied" satisfaction ranking, a numeric value of 0 may indicate a "neutral" satisfaction ranking (e.g., neither "satisfied" nor "dissatisfied"), and a numeric value of 1 may indicate a "satisfied" satisfaction ranking. Other labels can also be used to indicate the satisfaction rating.

At 1004, the first layer of the sentiment model 614A is trained by the model trainer 706. As discussed above, the model training agent 702 using the model trainer 706 trains a first layer of a machine learning model, such as semantic model 614A, and then trains other layers of the model 614. In some examples, for the semantic model 614A, the model trainer 706 of the model training agent 702 is trained to receive instances of the training data 708 as a textual string and produce a first binary output that indicates whether the textual string has a "satisfied" satisfaction ranking, utilizing the entire group of training data 708. The first binary output may include a value of 1 to indicate that the textual string has a "satisfied"/positive satisfaction ranking, and the first binary output may include a value of 0 to indicate that the textual string does not have a "satisfied" satisfaction ranking (e.g., has an "other" ranking).

At 1006, instances of the training data 708 determined at 1004 to have a "satisfied" satisfaction ranking are removed from the training data 708 to generate second training data 708A. As discussed above, after the model trainer 706 identifies the instances of training data 708 that have a "satisfied" satisfaction ranking, the dataset pre-processor 704 removes the instances of the training data 708 that were identified as having the "satisfied" satisfaction ranking from the training data 708 to create the second training data 708A.

At 1008, the second layer of the sentiment model 614A is trained using the second training data 708A. As discussed above, the second training data 708A is used to train a second layer of the machine learning environment. The model trainer 706 of the model training agent 702 is trained to receive instances of the second training data 708A as a textual string and produce a second binary output that indicates whether the textual string has a "neutral" or "dissatisfied" satisfaction ranking.

At 1010, the sentiment model 614A is saved and deployed for use within a machine learning environment. As discussed above, after training the different layers of the semantic model 614A, sentiment analysis can be performed on one or more instances of unlabeled user feedback data 712, including determining a sentiment score for each instance of unlabeled user feedback, utilizing the different layers of the trained machine learning environment.

Figure 11:
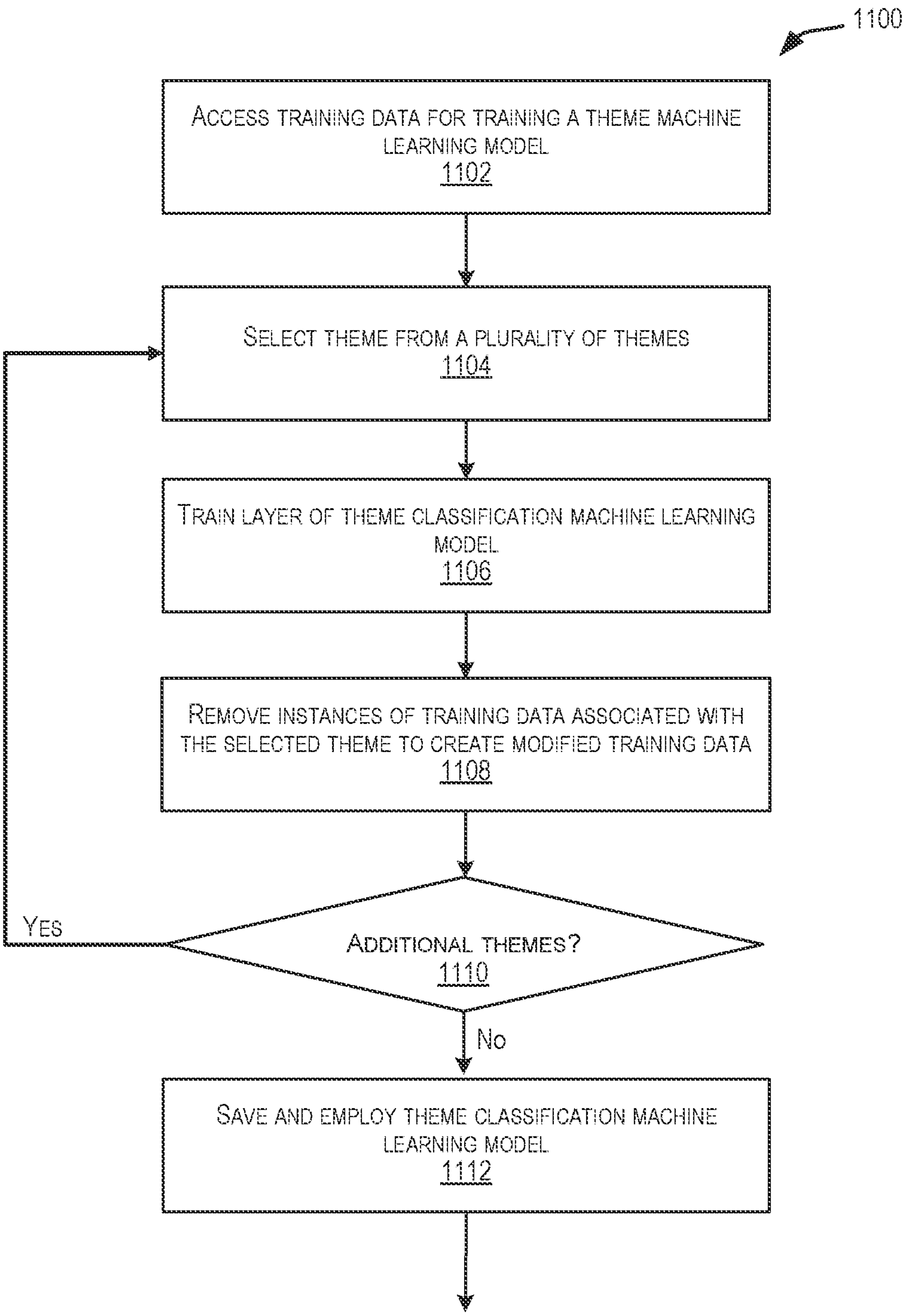
FIG. 11 illustrates an example flowchart depicting a method for training different layers of a theme machine learning model, according to certain embodiments.

FIG. 11 illustrates a flowchart 1100 that depicts operations relating to training different layers of a theme model 614B. In some examples, the processing may be performed by the machine learning agent 606, the model training agent 702, and/or some other device component when performing operations described herein related to distributed rate limiting.

Processing may begin at 1102, where training data 708 is accessed to train a first layer of a theme model 614B for a machine learning environment. As discussed above, the model training agent 702 identifies the training data 708 that is associated with training the theme model 614B. In some configurations, each instance of training data 708 includes a theme value (such as a textual string) indicative of a theme assigned to the instance of training data.

At 1104, a theme is selected to train from a plurality of themes. As discussed above, a model training agent, there may be many different themes associated with user feedback 612. In some examples, as discussed below, the theme that has the least noise associated with the training data 708 is selected to be trained first. In other examples, a different theme can be selected by the model training agent 702.

At 1106, the layer of the theme model 614B associated with the selected theme is trained. As discussed above, a model training agent, such as model training agent 702, trains a single layer of a machine learning model, such as the theme model 614B, and then trains a next layer (associated with a different theme). In some examples, for the theme model 614B, the model trainer 706 is trained to receive instances of the training data 708 as a textual string and produce an output that indicates that the instances of the training data 708 are identified as the selected theme from 1104, using the training data 708 associated with training the theme model 614B. When training the first layer of the theme model 614B, all of the training data 708 associated with training the theme model 614B. When training a second layer, or subsequent layer, the training data 708 will include the instances of training data 708 that have not already been selected and trained.

At 1108, instances of training data 708 determined to have the selected theme are removed from the training data 708 to generate remaining theme training data 708B. As discussed above, the dataset pre-processor 704 removes the portion of the training data 708 that were identified as the selected theme to create remaining theme training data 708B. The model trainer 706 then uses the remaining theme training data 708B to train a next layer of the machine learning environment.

At 1110, a determination is made to identify whether there are remaining themes. As discussed above, when there are remaining themes, the process flows to 1102. When there are not any remaining themes, the process flows to 1110. Generally, after training each layer of the machine learning environment to identify a predetermined theme value, instances of training data with that predetermined theme value are removed from the group of training data 708 until only two theme values remain within the training data. The last layer of the machine learning environment may then be trained to take a textual string as input and produce a binary output that indicates one of the last two theme values, utilizing the training data that includes the only two theme values.

At 1112, the theme model 614B is saved and deployed for use within a machine learning environment. As discussed above, output from the theme model 614B can be used to identify themes.

Figure 12:
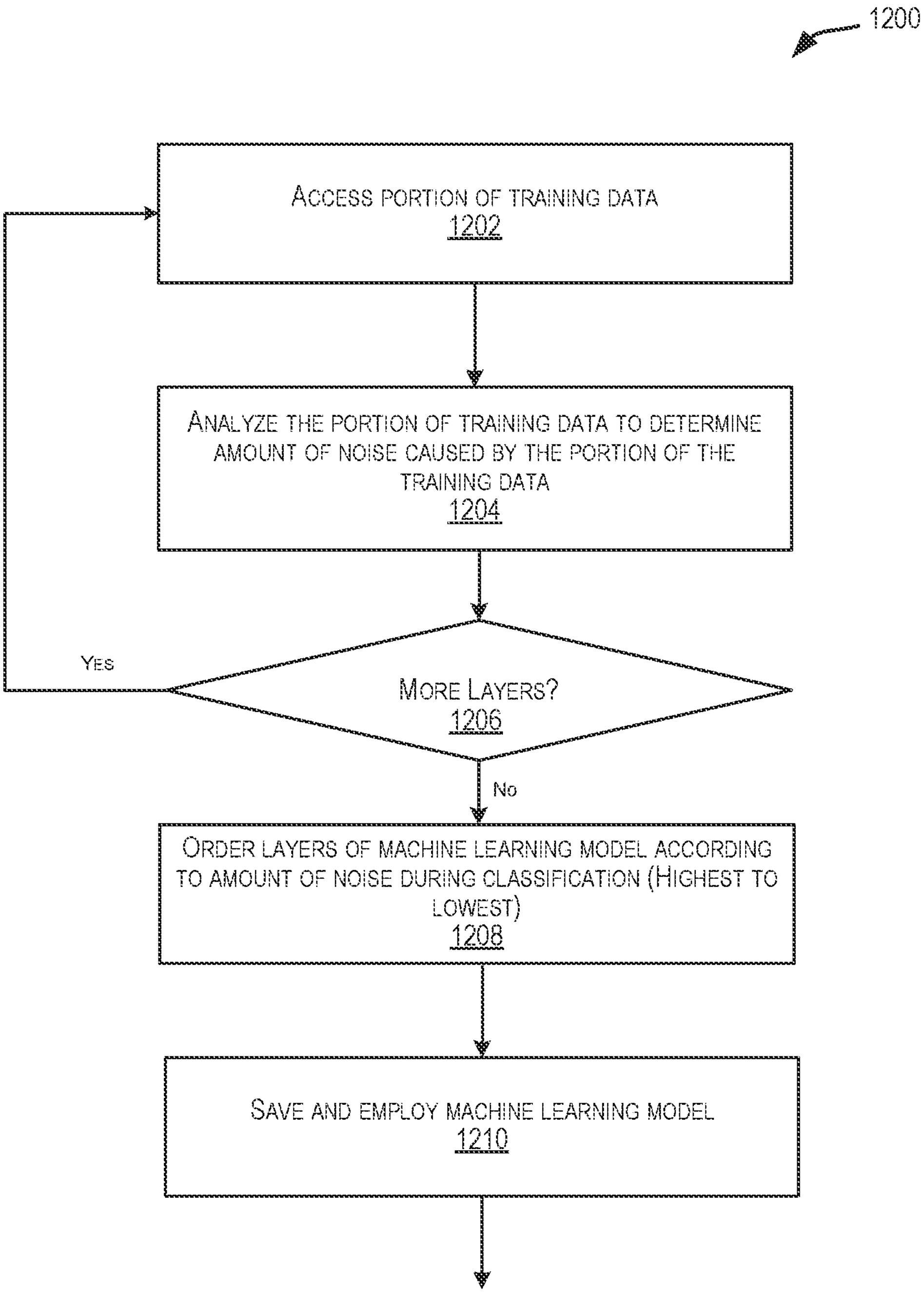
FIG. 12 illustrates an example flowchart depicting a method for pre-processing training data to determine an order of layers used within a theme machine learning model, according to certain embodiments.

FIG. 12 illustrates a flowchart 1200 that depicts operations relating to pre-processing training data to determine an order of layers used within a machine learning model 614B. In some examples, the pre-processing may be performed by the dataset pre-processor 704, the model training agent 702, and/or some other device component when performing operations described herein related to distributed rate limiting.

Processing may begin at 1202, where a portion of training data 708 is accessed. As discussed above, the training data 708 may be associated with training a machine learning model 614, such as a theme model 614B and/or a sentiment analysis model 614A. In some examples, the portion of training data accessed is associated with an individual theme selected from a plurality of themes.

At 1204, the portion of the training data is programmatically analyzed to determine an amount of noise caused by the portion of the training data. As discussed above, in some examples, the portion of training data 708 may be analyzed to determine an amount of noise caused by training data with each individual theme value. Determining the amount of noise caused by training data (e.g., having a predetermined theme value) may include determining a data entropy value for the training data having a predetermined value (e.g., a predetermined theme value).

At 1206, a determination is made to identify whether there are remaining layers to process. In some examples, when there are remaining layers (e.g., additional layers to train), the process flows to 1202. When there are not any remaining layers, the process flows to 1208.

At 1208, the layers of the model 614B are ordered according to the amount of noise generated by the training data 708 associated with the different layers. As discussed above, in some configurations, the noise generated with the training data 708 may be associated with noise generated from different theme values. In some configurations, the different layers may be organized in a list, starting with a layer that creates the largest amount of noise during classification (e.g., when compared to the other theme values) and ending with a layer that creates the smallest amount of noise during classification (e.g., when compared to the other theme values). In some configurations, the first theme value of the machine learning environment may include the first theme value in the organized list of theme values (e.g., the theme value that creates the largest amount of noise during classification). The second theme value of the machine learning environment may include the second theme value in the organized list of theme values (e.g., the theme value that creates the second largest amount of noise during classification).

At 1210, the machine learning model 614 is saved and deployed for use within a machine learning environment. As discussed above, the machine learning model 614 may be a theme model 614B and/or a sentiment analysis model 614A.

Example CSPI Architectures for Providing Cloud Services

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
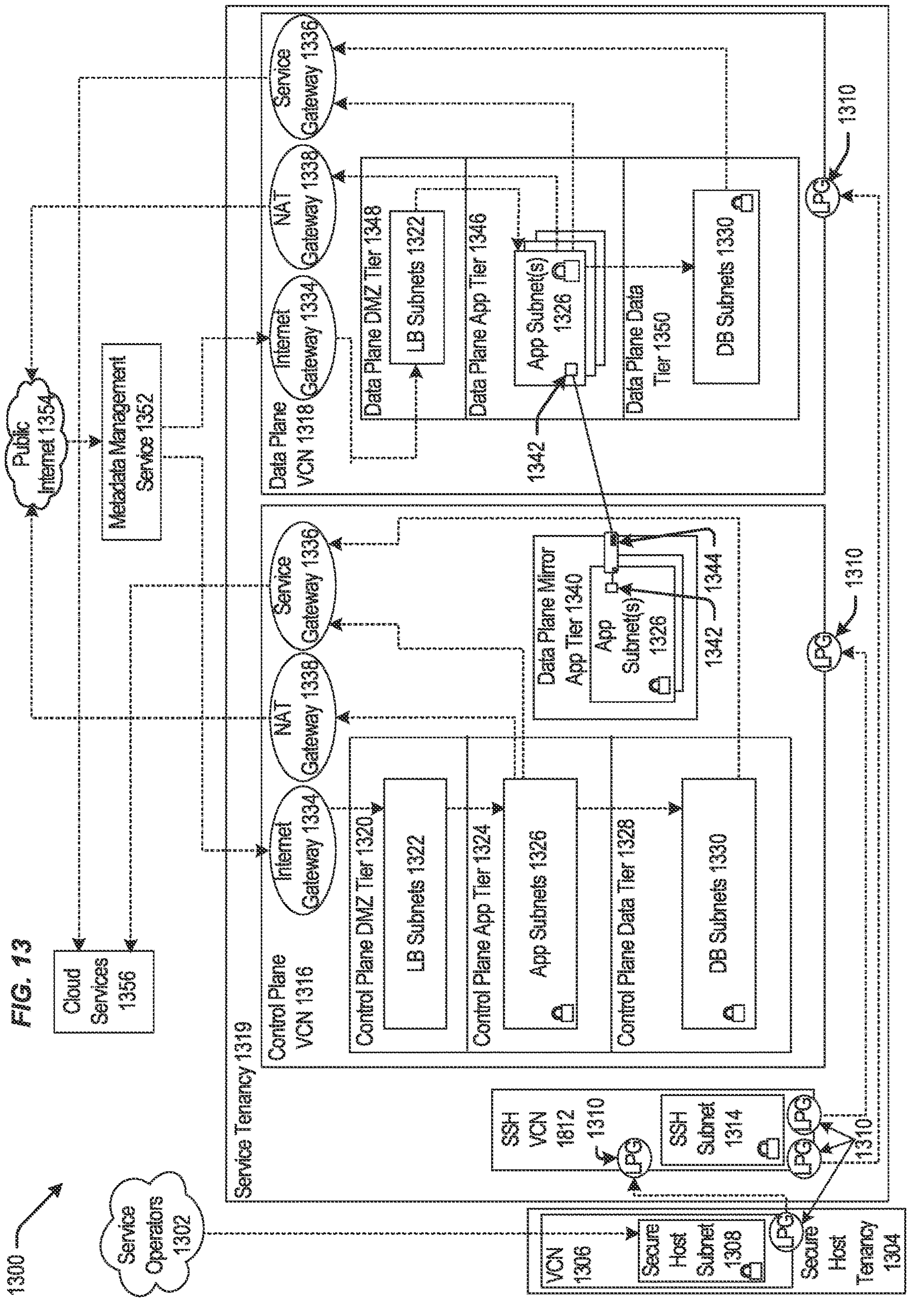
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Metadata that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
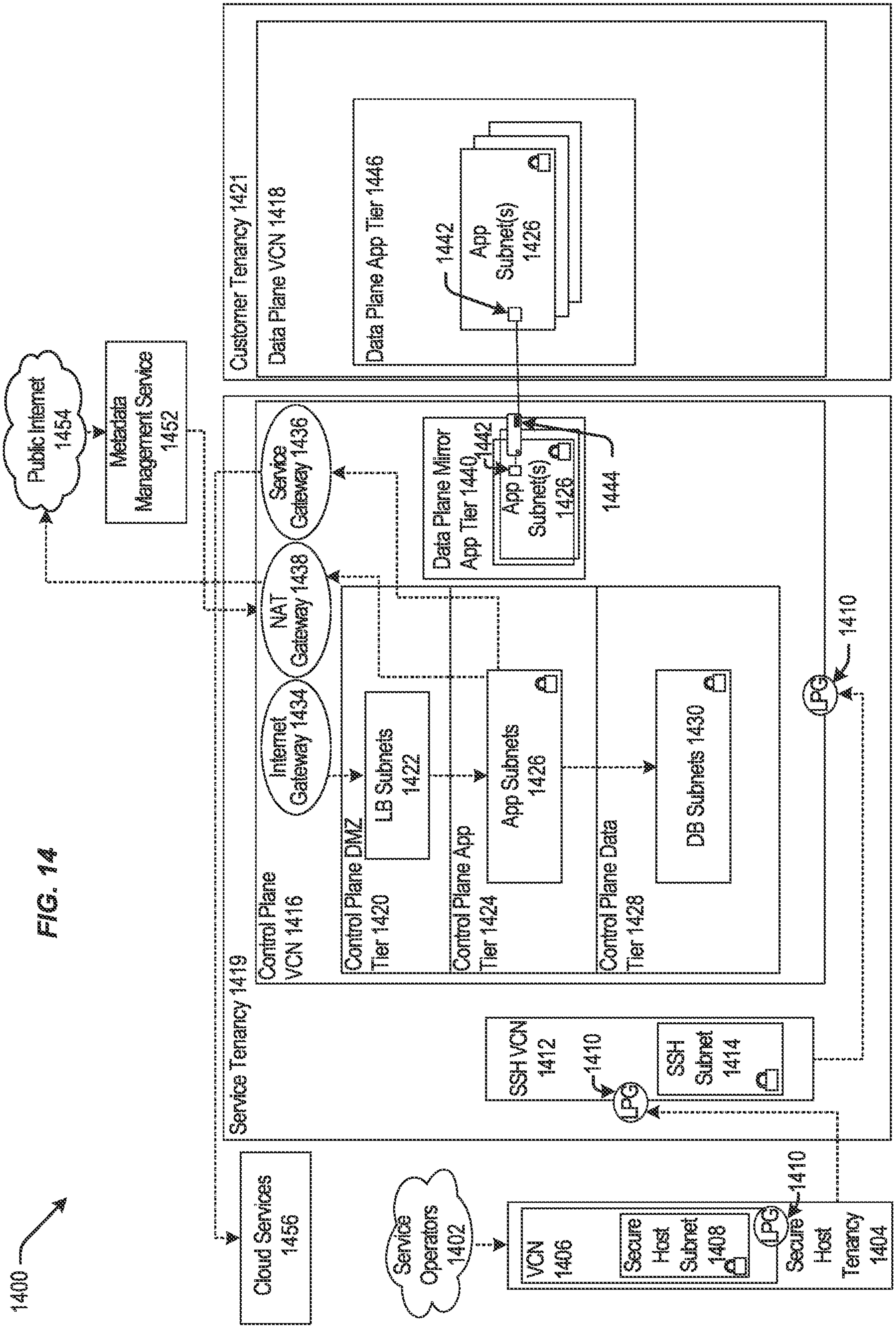
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1302 of FIG. 13) can be communicatively coupled to a secure host tenancy 1404 (e.g., the secure host tenancy 1304 of FIG. 13) that can include a virtual cloud network (VCN) 1406 (e.g., the VCN 1306 of FIG. 13) and a secure host subnet 1408 (e.g., the secure host subnet 1308 of FIG. 13). The VCN 1406 can include a local peering gateway (LPG) 1410 (e.g., the LPG 1310 of FIG. 13) that can be communicatively coupled to a secure shell (SSH) VCN 1412 (e.g., the SSH VCN 1312 of FIG. 13) via an LPG 1310 contained in the SSH VCN 1412. The SSH VCN 1412 can include an SSH subnet 1414 (e.g., the SSH subnet 1314 of FIG. 13), and the SSH VCN 1412 can be communicatively coupled to a control plane VCN 1416 (e.g., the control plane VCN 1316 of FIG. 13) via an LPG 1410 contained in the control plane VCN 1416. The control plane VCN 1416 can be contained in a service tenancy 1419 (e.g., the service tenancy 1319 of FIG. 13), and the data plane VCN 1418 (e.g., the data plane VCN 1318 of FIG. 13) can be contained in a customer tenancy 1421 that may be owned or operated by users, or customers, of the system.

The control plane VCN 1416 can include a control plane DMZ tier 1420 (e.g., the control plane DMZ tier 1320 of FIG. 13) that can include LB subnet(s) 1422 (e.g., LB subnet(s) 1322 of FIG. 13), a control plane app tier 1424 (e.g., the control plane app tier 1324 of FIG. 13) that can include app subnet(s) 1426 (e.g., app subnet(s) 1326 of FIG. 13), a control plane data tier 1428 (e.g., the control plane data tier 1328 of FIG. 13) that can include database (DB) subnet(s) 1430 (e.g., similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g., the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g., the service gateway 1336 of FIG. 13) and a network address translation (NAT) gateway 1438 (e.g., the NAT gateway 1338 of FIG. 13). The control plane VCN 1416 can include the service gateway 1436 and the NAT gateway 1438.

The control plane VCN 1416 can include a data plane mirror app tier 1440 (e.g., the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g., the VNIC of 1342) that can execute a compute instance 1444 (e.g., similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g., the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g., the metadata management service 1352 of FIG. 13) that can be communicatively coupled to public Internet 1454 (e.g., public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g., cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 16," may be located in Region 1 and in "Region 2." If a call to Deployment 16 is made by the service gateway 1436 contained in the control plane VCN 1416 located in Region 1, the call may be transmitted to Deployment 16 in Region 1. In this example, the control plane VCN 1416, or Deployment 16 in Region 1, may not be communicatively coupled to, or otherwise in communication with, Deployment 16 in Region 2.

Figure 15:
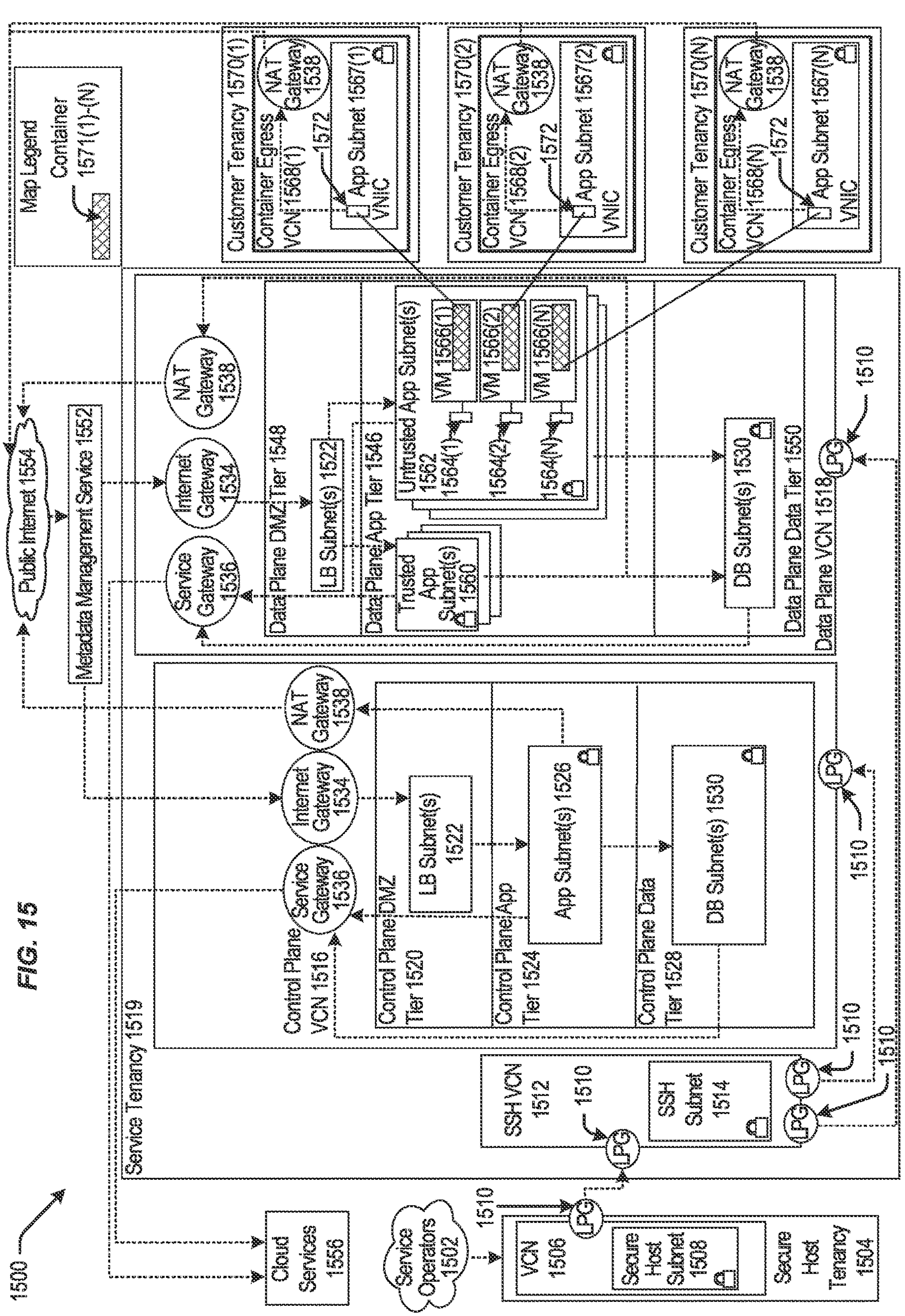
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1302 of FIG. 13) can be communicatively coupled to a secure host tenancy 1504 (e.g., the secure host tenancy 1304 of FIG. 13) that can include a virtual cloud network (VCN) 1506 (e.g., the VCN 1306 of FIG. 13) and a secure host subnet 1508 (e.g., the secure host subnet 1308 of FIG. 13). The VCN 1506 can include an LPG 1510 (e.g., the LPG 1310 of FIG. 13) that can be communicatively coupled to an SSH VCN 1512 (e.g., the SSH VCN 1312 of FIG. 13) via an LPG 1510 contained in the SSH VCN 1512. The SSH VCN 1512 can include an SSH subnet 1514 (e.g., the SSH subnet 1314 of FIG. 13), and the SSH VCN 1512 can be communicatively coupled to a control plane VCN 1516 (e.g., the control plane VCN 1316 of FIG. 13) via an LPG 1510 contained in the control plane VCN 1516 and to a data plane VCN 1518 (e.g., the data plane 1318 of FIG. 13) via an LPG 1510 contained in the data plane VCN 1518. The control plane VCN 1516 and the data plane VCN 1518 can be contained in a service tenancy 1519 (e.g., the service tenancy 1319 of FIG. 13).

The control plane VCN 1516 can include a control plane DMZ tier 1520 (e.g., the control plane DMZ tier 1320 of FIG. 13) that can include load balancer (LB) subnet(s) 1522 (e.g., LB subnet(s) 1322 of FIG. 13), a control plane app tier 1524 (e.g., the control plane app tier 1324 of FIG. 13) that can include app subnet(s) 1526 (e.g., similar to app subnet(s) 1326 of FIG. 13), a control plane data tier 1528 (e.g., the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 13) and a network address translation (NAT) gateway 1538 (e.g., the NAT gateway 1338 of FIG. 13). The control plane VCN 1516 can include the service gateway 1536 and the NAT gateway 1538.

The data plane VCN 1518 can include a data plane app tier 1546 (e.g., the data plane app tier 1346 of FIG. 13), a data plane DMZ tier 1548 (e.g., the data plane DMZ tier 1348 of FIG. 13), and a data plane data tier 1550 (e.g., the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g., public Internet 1354 of FIG. 13).

The Internet gateway 1534 contained in the control plane VCN 1516 and contained in the data plane VCN 1518 can be communicatively coupled to a metadata management service 1552 (e.g., the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
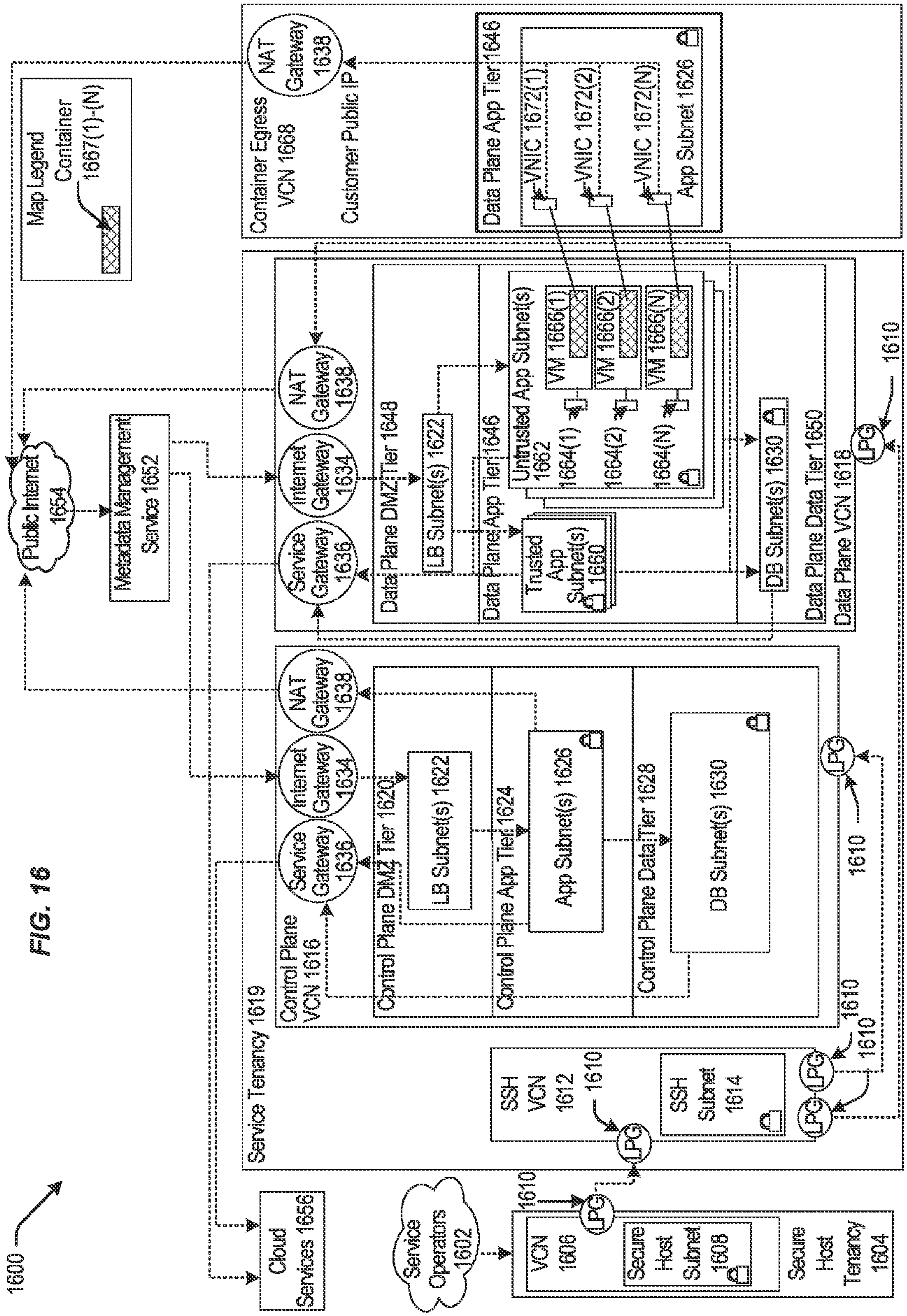
FIG. 16 is a block diagram illustrating another pattern for implementing a cloud infrastructure as a service system, according to at least one embodiment.
Figure 17:
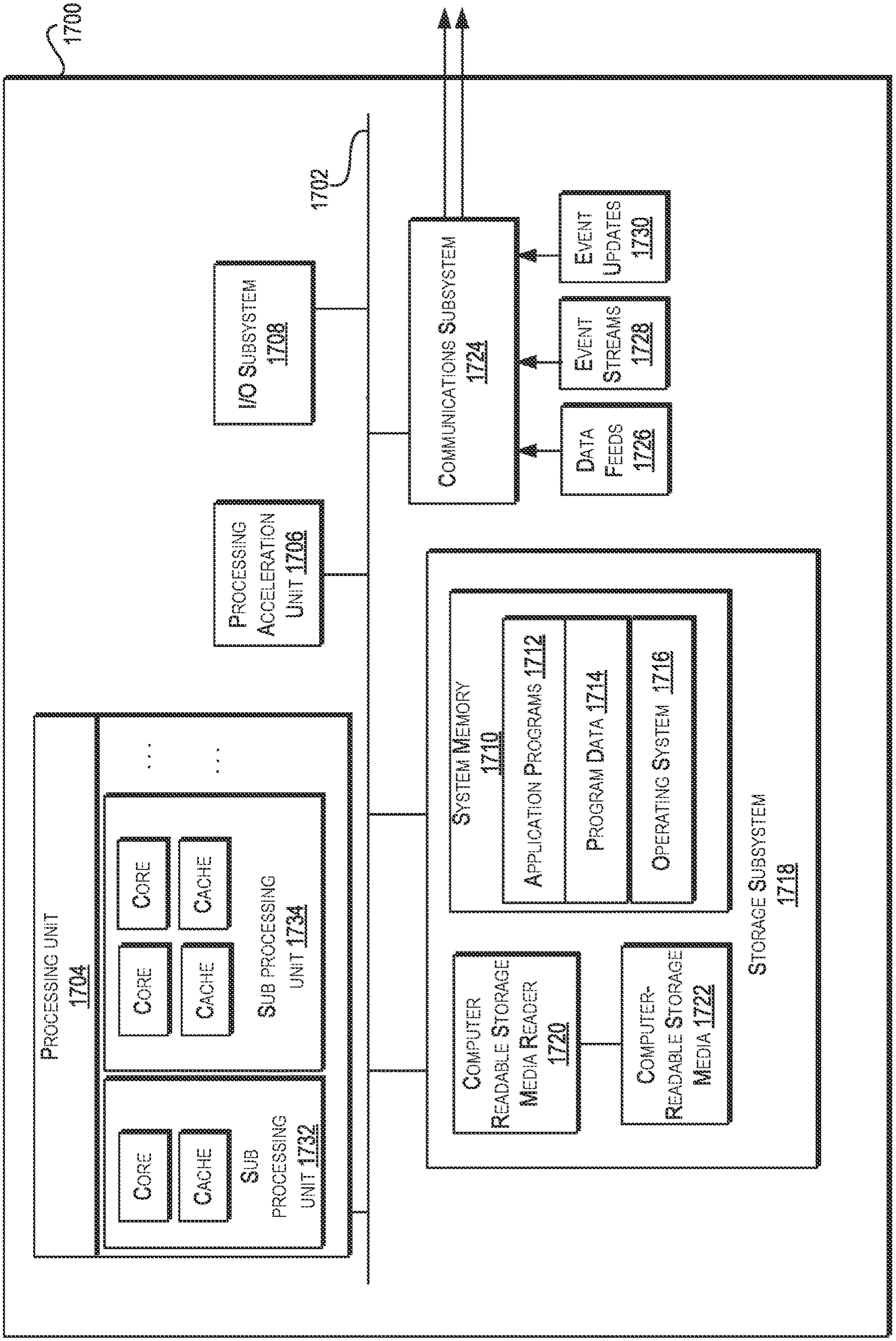
FIG. 17 is a block diagram illustrating an example computer system, according to at least one embodiment.

FIG. 16 is a block diagram 1600 illustrating another example pattern of an IaaS architecture, according to at least one embodiment. Service operators 1602 (e.g., service operators 1302 of FIG. 13) can be communicatively coupled to a secure host tenancy 1604 (e.g., the secure host tenancy 1304 of FIG. 13) that can include a virtual cloud network (VCN) 1606 (e.g., the VCN 1306 of FIG. 13) and a secure host subnet 1608 (e.g., the secure host subnet 1308 of FIG. 13). The VCN 1606 can include an LPG 1610 (e.g., the LPG 1310 of FIG. 13) that can be communicatively coupled to an SSH VCN 1612 (e.g., the SSH VCN 1312 of FIG. 13) via an LPG 1610 contained in the SSH VCN 1612. The SSH VCN 1612 can include an SSH subnet 1614 (e.g., the SSH subnet 1314 of FIG. 13), and the SSH VCN 1612 can be communicatively coupled to a control plane VCN 1616 (e.g., the control plane VCN 1316 of FIG. 13) via an LPG 1610 contained in the control plane VCN 1616 and to a data plane VCN 1618 (e.g., the data plane 1318 of FIG. 13) via an LPG 1610 contained in the data plane VCN 1618. The control plane VCN 1616 and the data plane VCN 1618 can be contained in a service tenancy 1619 (e.g., the service tenancy 1319 of FIG. 13).

The control plane VCN 1616 can include a control plane DMZ tier 1620 (e.g., the control plane DMZ tier 1320 of FIG. 13) that can include LB subnet(s) 1622 (e.g., LB subnet(s) 1322 of FIG. 13), a control plane app tier 1624 (e.g., the control plane app tier 1324 of FIG. 13) that can include app subnet(s) 1626 (e.g., app subnet(s) 1326 of FIG. 13), a control plane data tier 1628 (e.g., the control plane data tier 1328 of FIG. 13) that can include DB subnet(s) 1630 (e.g., DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g., the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g., the service gateway of FIG. 13) and a network address translation (NAT) gateway 1638 (e.g., the NAT gateway 1338 of FIG. 13). The control plane VCN 1616 can include the service gateway 1636 and the NAT gateway 1638.

The data plane VCN 1618 can include a data plane app tier 1646 (e.g., the data plane app tier 1346 of FIG. 13), a data plane DMZ tier 1648 (e.g., the data plane DMZ tier 1348 of FIG. 13), and a data plane data tier 1650 (e.g., the data plane data tier 1350 of FIG. 13). The data plane DMZ tier 1648 can include LB subnet(s) 1622 that can be communicatively coupled to trusted app subnet(s) 1660 (e.g., trusted app subnet(s) 1560 of FIG. 15) and untrusted app subnet(s) 1662 (e.g., untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g., public Internet 1354 of FIG. 13).

The Internet gateway 1634 contained in the control plane VCN 1616 and contained in the data plane VCN 1618 can be communicatively coupled to a metadata management service 1652 (e.g., the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1704 provide the functionality described above. Storage subsystem 1718 may also provide a repository for storing data used in accordance with the present disclosure.

As depicted in the example in FIG. 17, storage subsystem 1718 can include various components including a system memory 1710, computer-readable storage media 1722, and a computer readable storage media reader 1720. System memory 1710 may store program instructions that are loadable and executable by processing unit 1704. System memory 1710 may also store data that is used during the execution of the instructions and/or data that is generated during the execution of the program instructions. Various different kinds of programs may be loaded into system memory 1710 including but not limited to client applications, Web browsers, mid-tier applications, relational database management systems (RDBMS), virtual machines, containers, etc.

System memory 1710 may also store an operating system 1716. Examples of operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1700 executes one or more virtual machines, the virtual machines along with their guest operating systems (GOSs) may be loaded into system memory 1710 and executed by one or more processors or cores of processing unit 1704.

System memory 1710 can come in different configurations depending upon the type of computer system 1700. For example, system memory 1710 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1710 may include a basic input/output system (BIOS) containing basic routines that help to transfer information between elements within computer system 1700, such as during start-up.

Computer-readable storage media 1722 may represent remote, local, fixed, and/or removable storage devices plus storage media for temporarily and/or more permanently containing, storing, computer-readable information for use by computer system 1700 including instructions executable by processing unit 1704 of computer system 1700.

Computer-readable storage media 1722 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Machine-readable instructions executable by one or more processors or cores of processing unit 1704 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

determining, via one or more processors, user feedback data, wherein the user feedback data includes first user feedback data that is obtained from at least one of one or more computing devices of a cloud service provider (CSP), and second user feedback data that is obtained from one or more external computing devices associated with at least one of a social network, a messaging service, an Internet forum, or a chat room;

monitor operations to generate, via the one or more processors, metrics associated with categories including a mindshare category, a happiness category, and one or more other categories that include at least one of an adoption category, a success of tasks category, an engagement category, or a retention category;

generating, via the one or more processors, a happiness score based, at least in part on the first user feedback data, wherein the happiness score indicates responses to one or more products of the CSP, one or more services of the CSP, or one or more features of the CSP;

generating, via the one or more processors, a mindshare score based, at least in part on the second user feedback data, wherein the mindshare score indicates responses to one or more products of the CSP, one or more services of the CSP, or one or more features of the CSP;

wherein generating at least one of the happiness score or the mindshare score comprises:

training a first layer of one or more machine learning models to produce a first binary output that indicates a satisfaction ranking for instances of training data;

creating modified training data by removing the instances of the training data that have the satisfaction ranking;

training a second layer of the one or more machine learning models using the modified training data to produce a second binary output indicating a neutral or dissatisfied ranking; and ordering a plurality of layers of the one or more machine learning models based on an amount of noise caused by different theme values in the training data;

generating, via the one or more processors, one or more other scores for individual ones of the one or more other categories;

generating a unified user experience (UX) score, via the one or more processors, based at least in part on the happiness score, the mindshare score and the one or more other scores, wherein each category associated with the scores contributes a predetermined percentage of the unified UX score; and causing information about the unified UX score to be provided to a computing device associated with a user.

2. The method of claim 1, wherein the operations are associated with at least one of a service, a product, or a feature performed within a network associated with the cloud service provider, and wherein generating the metrics is based, at least in part, on the monitoring.

3. The method of claim 1, wherein generating the one or more other scores, comprises:

determining, via the one or more processors, an adoption score associated with the adoption category;

determining, via the one or more processors, a success of tasks score associated with the success of tasks category;

determining, via the one or more processors, an engagement score associated with the engagement category; and determining, via the one or more processors, a retention score associated with the retention category.

4. The method of claim 1, wherein determining the happiness score comprises:

performing sentiment analysis on instances of the first user feedback data associated with a predetermined time period to generate happiness scores; and generating an overall happiness score based on the happiness scores.

5. The method of claim 1, wherein determining the mindshare score comprises:

performing sentiment analysis on instances of the second user feedback data associated with a predetermined time period to generate mindshare scores; and generating an overall mindshare score based on the mindshare scores.

6. The method of claim 1, wherein generating at least one of the happiness score or the mindshare score comprises providing individual instances of the user feedback to a machine learning environment that uses a sentiment model to generate an output, wherein the output comprises one of a positive output value that is indicative of a satisfied sentiment, a neutral output value that is indicative of a neutral sentiment, or a negative output value that is indicative of a negative sentiment.

7. The method of claim 1, wherein generating the unified UX score comprises:

generating a happiness contribution of the happiness score to the unified UX score;

generating a mindshare contribution of the mindshare score to the unified UX score; and generating one or more other contributions for the one or more other scores to the unified UX score.

8. The method of claim 1, wherein generating the mindshare score comprises performing sentiment analysis on the second user feedback that is obtained from a social networking platform.

9. The method of claim 1, wherein the user feedback is associated with an organization.

10. The method of claim 1, further comprising determining a theme for individual instances of the user feedback data.

11. The method of claim 10, wherein determining the theme comprises generating, by the one or more processors and using a theme machine learning model, individual themes for the individual instances of the user feedback data.

12. The method of claim 11, wherein one or more of the happiness score, or the mindshare score is adjusted based on one or more of the individual themes generated by the theme machine learning model.

13. A system comprising:

one or more processors; and non-transitory computer-readable medium storing a set of instructions, the set of instructions when executed by the one or more processors cause processing to be performed comprising:

determining user feedback data, wherein the user feedback data includes first user feedback data that is obtained directly from at least one of one or more computing devices of a cloud service provider (CSP), and second user feedback data that is obtained from one or more external computing devices associated with at least one of a social network, a messaging service, an Internet forum, or a chat room;

generating metrics associated with categories including a happiness category, an adoption category, a mindshare category, a success of tasks category, an engagement category, and a retention category;

generating, via the one or more processors, a happiness score based, at least in part on the first user feedback data, wherein the happiness score indicates responses to one or more products of the CSP, one or more services of the CSP, or one or more features of the CSP;

generating, via the one or more processors, a mindshare score based, at least in part on the second user feedback data, wherein the mindshare score indicates responses to one or more products of the CSP, one or more services of the CSP, or one or more features of the CSP;

wherein generating at least one of the happiness score or the mindshare score comprises:

training a first layer of one or more machine learning models to produce a first binary output that indicates a satisfaction ranking for instances of training data;

creating modified training data by removing the instances of the training data that have the satisfaction ranking;

training a second layer of the one or more machine learning models using the modified training data to produce a second binary output indicating a neutral or dissatisfied ranking; and ordering a plurality of layers of the one or more machine learning models based on an amount of noise caused by different theme values in the training data;

generating, via the one or more processors, one or more other scores for individual ones of the one or more other categories;

generating a unified user experience (UX) score, via the one or more processors, based at least in part on the happiness score, the mindshare score and the one or more other scores, wherein each category associated with the scores contributes a predetermined percentage of the unified UX score; and causing information about the unified UX score to be provided to a computing device associated with a user.

14. The system of claim 13, further comprising monitoring, via one or more processors, operations associated with at least one of a service, a product, or a feature performed within a network associated with the cloud service provider, and wherein determining generating the metrics is based, at least in part, on the monitoring.

15. The system of claim 13, wherein determining the happiness score comprises:

performing sentiment analysis on instances of the first user feedback data to generate happiness scores; and generating an overall happiness score based on the happiness scores.

16. The system of claim 13, wherein determining the mindshare score comprises:

performing sentiment analysis on instances of the second user feedback data to generate mindshare scores; and generating an overall mindshare score based on the mindshare scores.

17. The system of claim 13, wherein generating the happiness score and the mindshare score comprises:

providing individual instances of the user feedback to a machine learning environment that uses a sentiment model to generate an output, wherein the output comprises one of a positive output value that is indicative of a satisfied sentiment, a neutral output value that is indicative of a neutral sentiment, or a negative output value that is indicative of a negative sentiment.

18. The system of claim 13, further comprising determining a theme for individual instances of the user feedback data and adjusting a value of at least one of the mindshare score, or the happiness score based on the theme for the individual instances.

19. A non-transitory computer-readable medium storing a set of instructions, the set of instructions when executed by one or more processors cause processing to be performed comprising:

determining user feedback data, wherein the user feedback data includes first user feedback data that is obtained directly from at least one of one or more computing devices of a cloud service provider (CSP), and second user feedback data that is obtained from one or more external computing devices associated with at least one of a social network, a messaging service, an Internet forum, or a chat room;

generating metrics associated with categories including a happiness category, an adoption category, a mindshare category, a success of tasks category, an engagement category, and a retention category;

generating, via the one or more processors, a happiness score based, at least in part on the first user feedback data, wherein the happiness score indicates responses to one or more products of the CSP, one or more services of the CSP, or one or more features of the CSP;

generating, via the one or more processors, a mindshare score based, at least in part on the second user feedback data, wherein the mindshare score indicates responses to one or more products of the CSP, one or more services of the CSP, or one or more features of the CSP;

wherein generating at least one of the happiness score or the mindshare score comprises:

training a first layer of one or more machine learning models to produce a first binary output that indicates a satisfaction ranking for instances of training data;

creating modified training data by removing the instances of the training data that have the satisfaction ranking;

training a second layer of the one or more machine learning models using the modified training data to produce a second binary output indicating a neutral or dissatisfied ranking; and ordering a plurality of layers of the one or more machine learning models based on an amount of noise caused by different theme values in the training data;

generating, via the one or more processors, one or more other scores for one or more other categories;

generating a unified user experience (UX) score, via the one or more processors, based at least in part on the happiness score, the mindshare score and the one or more other scores, wherein each category associated with the scores contributes a predetermined percentage of the unified UX score; and causing information about the unified UX score to be provided to a computing device associated with a user.

20. The non-transitory computer-readable medium of claim 19, wherein the processing to be performed further comprises:

performing sentiment analysis on first instances of the first user feedback data to generate happiness scores;

performing sentiment analysis on second instances of the second user feedback data to generate mindshare scores;

generating an overall happiness score based on the happiness scores; and generating an overall mindshare score based on the mindshare scores.

* * * * *